United States Patent [19]
Patterson

[11] Patent Number: 5,992,759
[45] Date of Patent: Nov. 30, 1999

[54] MATERIAL SPREADER ATTACHMENT FOR MOUNTING ON A TRACTOR

[75] Inventor: Roger L. Patterson, Selkirk, Canada

[73] Assignee: MacDon Industries Ltd., Winnipeg, Canada

[21] Appl. No.: 09/020,855

[22] Filed: Feb. 9, 1998

[51] Int. Cl.$^6$ ..................................................... B05B 1/20
[52] U.S. Cl. ........................ 239/167; 239/159; 239/165; 239/166; 239/168
[58] Field of Search .................................. 239/159, 161, 239/165, 166, 167, 168, 172

[56] References Cited

U.S. PATENT DOCUMENTS

| | | | |
|---|---|---|---|
| 2,995,307 | 8/1961 | McMahon | 239/172 X |
| 3,223,330 | 12/1965 | La Plante | 239/172 X |
| 3,447,750 | 6/1969 | Weston | 239/172 X |
| 3,902,667 | 9/1975 | Jackson | 239/172 X |
| 4,252,274 | 2/1981 | Kubacak | 239/172 X |
| 5,199,196 | 4/1993 | Straley | 239/172 X |

OTHER PUBLICATIONS

Brochure by Tyler—"Patriot Applicator" (4 pages).
Brochure by Tyler—"Patriot Applicators" (6 pages).
Brochure by Flexicoil—"6565 Field Sprayer" (6 pages).
Brochure by Knight—"Model KM1000" (4 pages).
Brochure by Melroe—"Spra–Coupe— 3000 Series" (2 pages).
Brochure by Melroe—"Spra–Coupe— Options & Accessories" (3 pages).
Brochure by Melroe—"Spra–Coupe— 230 Series" (4 pages).
Brochure by John Deere—"6500 Self–Propelled Sprayer" (18 pages).
Brochure by Hagie—"284 Sprayer" (4 pages).
Brochure by Setter Manufacturing Division—"Setter's Swather Conversion High Clearance Sprayer" (4 pages).
Brochure by MacDon Industries Ltd.—"Premier 2900" (4 pages).

*Primary Examiner*—Andres Kashnikow
*Assistant Examiner*—Robin O. Evans
*Attorney, Agent, or Firm*—Adrian D. Battison; Murray E. Thrift

[57] ABSTRACT

A sprayer attachment is designed for mounting upon a swather tractor and includes a central frame with a tank which can be carried upon the front arms of the swather tractor. Two masts each carry a respective one of a pair of booms, each for extending outwardly to a respective side of the tractor for movement with the tractor in a spraying action. Each boom includes an inner section, an outer section and a tip portion. In the folding action the outer section and tip portion are folded about a horizontal axis so as to move to a position overlying the inner section. The folded boom is then pivoted about a vertical axis at the mast to lie along side the side of the tractor. The tip portion includes a parallel cable in advance of the tip portion for impacting an obstacle with the cable actuating release of the latch and accelerating the tip portion away from the obstacle to prevent impact with the obstacle. The tip portion is also moved to the retracted position during the folding action so that the maximum height of the outer section during folding is reduced to avoid contact with power lines and the like. The booms are inclined outwardly and rearwardly in the extended position to move the center of gravity rearwardly. The tank has two recessed sides to receive the arms of the swather tractor and a front which is inclined forwardly and downwardly to improve vision. Each boom is movable vertically along a vertical supporting mast independently for height adjustment. A hydraulic and electrical coupling allows the existing control lever of the swather tractor to control the boom movement.

21 Claims, 20 Drawing Sheets

MATERIAL SPREADER ATTACHMENT FOR MOUNTING ON A TRACTOR

This application is related to co-pending application Ser. No. 08/904,148 filed Jul. 31, 1997 which is directed to the construction of a boom suitable for use with this invention.

This invention relates to a material spreader attachment for mounting on a tractor including a pair of booms and a central frame carrying a tank for containing the material to be spread. The present invention is particularly concerned with a sprayer for liquid but could also be used in other distribution systems for example for distributing particulate or granular materials in an air stream.

BACKGROUND OF THE INVENTION

The present invention is particularly but not exclusively designed for use as a conversion system for mounting a sprayer kit including a tank and booms on a conventional swather tractor. A previous example of this type of arrangement has been manufactured and sold by Setter Manufacturing Division and shown in a brochure entitled "Setter's Swather Conversion High Clearance Sprayer" in which a tank and boom are provided as a separate assembly for mounting on the forwardly extending supporting arms of the conventional swather tractor.

A swather tractor of this type is manufactured by the present assignees Macdon and is shown in a brochure entitled "Premier 2900".

Examples of sprayers are shown in brochures by Tyler showing the "Patriot" Applicator; by Flexicoil showing the "65 Field Sprayer"; by Knight showing the KM100 Field Sprayer; by Melroe showing the "Spray Coupe"; by John Deere showing the 6500 self propelled sprayer; and by Hagie showing the 284 sprayer.

The above arrangement by Setter is the only known disclosure of a sprayer attachment for mounting on a swather tractor but this arrangement has a number of disadvantages concerning location of the center of gravity of the attachment and therefore the loading on the front wheels and concerning the adjustment of the boom heights. The attachment has therefore only achieved limited success in the marketplace.

SUMMARY OF THE INVENTION

It is one object of the present invention to provide an improved attachment for spreading a fluid material across the ground which can be mounted on a tractor.

According to a first aspect of the invention there is provided a material spreader attachment for mounting on a tractor, wherein the tractor comprises a tractor frame, a plurality of ground wheels mounted on the frame for movement of the frame across the ground including a pair of front wheels spaced apart at a front of the frame, a cab located on the frame adjacent the front of the frame, and a pair of transversely spaced implement support arms mounted on the frame at the front of the frame so as to support an implement at the front of the frame;

the spreader attachment comprising:

a spreader frame arranged for mounting on the implement support arms for support thereby so as to be transported on the tractor across the ground, a tank for a fluid material to be distributed across the ground, the tank being mounted on the spreader frame;

a pair of booms each mounted on the spreader frame so as to extend outwardly to a respective side of the tractor and including a plurality of material distribution nozzles at spaced positions along the length of the boom;

the tank having a rear wall, a bottom wall, a front wall, a top wall and two side walls connected to form an integral hollow structure for receiving the material;

the side walls each having a horizontally recessed portion at the rear wall such that a width of the rear wall at the recessed portions is less than a width of the front wall, the recessed portion being arranged to receive respective ones of the implement support arms therein.

Preferably the recessed portion extend from the top wall to the bottom wall.

Preferably the top wall and bottom wall are substantially parallel at the recessed portions.

Preferably the top wall includes a front portion thereof which is forwardly and downwardly inclined such that the front wall has a height which is less than the height of the rear wall.

Preferably the top wall includes a substantially horizontal portion rearwardly of the front portion.

Preferably the tractor includes a PTO drive shaft for driving the implement and wherein the rear wall has a recess therein for receiving the PTO drive shaft projecting therein.

Preferably the bottom wall of the tank is substantially horizontal and substantially at a common height at a bottom surface of the tractor frame.

According to a second aspect of the invention there is provided a material spreader attachment for mounting on a tractor, wherein the tractor comprises a tractor frame, a plurality of ground wheels mounted on the frame for movement of the frame across the ground including a pair of front wheels spaced apart at a front of the frame, a cab located on the frame adjacent the front of the frame, and a pair of transversely spaced implement support arms mounted on the frame at the front of the frame so as to support an implement at the front of the frame;

the spreader attachment comprising:

a spreader frame arranged for mounting on the implement support arms for support thereby so as to be transported on the tractor across the ground, a tank for a fluid material to be distributed across the ground, the tank being mounted on the spreader frame;

a pair of booms each mounted on the spreader frame so as to extend outwardly to a respective side of the tractor and including a plurality of material distribution nozzles at spaced positions along the length of the boom;

each boom being movable between a folded transport position at the tractor and an extended working position in which the boom extends outwardly to a respective side of the tractor;

each boom being arranged in the working position so as to be inclined outwardly and rearwardly relative to a direction of forward movement of the tractor such that an outer end of each boom is rearward of an inner end of the respective boom.

Preferably an inner end of each boom is arranged forwardly of the front wheels and an outer end of each boom is arranged rearwardly of the front wheels.

Preferably an inner end of each boom is arranged forwardly of the cab and an outer end of each boom is arranged rearwardly of the cab.

According to a third aspect of the invention there is provided a material spreader attachment for mounting on a tractor, wherein the tractor comprises a tractor frame, a plurality of ground wheels mounted on the frame for movement of the frame across the ground including a pair of front wheels spaced apart at a front of the frame, a cab located on the frame adjacent the front of the frame, and a pair of transversely spaced implement support arms mounted on the frame at the front of the frame so as to support an implement at the front of the frame;

the spreader attachment comprising:

a spreader frame arranged for mounting on the implement support arms for support thereby so as to be transported on the tractor across the ground, a tank for a fluid material to be distributed across the ground, the tank being mounted on the spreader frame;

a pair of booms each mounted on the spreader frame so as to extend outwardly to a respective side of the tractor and including a plurality of material distribution nozzles at spaced positions along the length of the boom;

a pair of boom support masts each carrying a respective one of the booms with each mast being mounted on the frame for movement therewith;

each boom being mounted on the respective mast for movement in a substantially vertical, height adjustment direction independently of the other boom.

Preferably each mast is rotatable about a vertical axis for movement of the boom between a folded transport position at the tractor and an extended working position.

Preferably each boom is mounted on the mast for sliding movement relative thereto.

Preferably each boom includes a single upper slide member and a pair of lower slide members which are transversely spaced so that the slide members lie at apexes of a triangle and wherein the mast includes a single slide guide for receiving the upper slide member and a pair of lower slide guides each for receiving a respective one of the lower slide members.

Preferably the masts are interconnected by transverse tension braces.

Preferably each boom includes an outwardly and downwardly inclined brace extending from a top of the mast and wherein there is provided an energy damping spring system located in the brace for allowing suspension movements of the boom relative to the mast.

Preferably there is provided a front boom portion mounted in front of the frame between the masts, the front boom portion having one end attached to a respective one of the booms and the other end attached to the other of the booms for independent movement of the ends of the front boom section with the respective boom.

Preferably the tractor includes a control lever operable in sliding movement to control a forward speed of the tractor and two switches on the control lever for controlling the implement and wherein the attachment includes a hydraulic circuit and electrical control circuit arranged such that operation of one of the switches on the control lever operates lifting movement of one boom and operation of the other of the switches controls lifting movement of the other boom.

Preferably each boom includes an inner section and an outer section, the outer section being pivotally movable relative to the inner section about a horizontal axis at the outer end of the inner section and wherein there is provided a control switch operable to change operation of the first and second switches between a first position of the control switch in which one of the switches on the control lever operates lifting movement of one boom and operation of the other of the switches controls lifting movement of the other boom and a second position of the control switch in which one of the switches on the control lever operates lifting movement of the outer section only of one boom and operation of the other of the switches controls lifting movement of the outer section only of the other boom.

According to a fourth aspect of the invention there is provided a tractor having a material spreader attachment mounted thereon comprising:

a tractor frame;

a plurality of ground wheels mounted on the frame for movement of the frame across the ground including a pair of front wheels spaced apart at a front of the frame;

a cab located on the frame adjacent the front of the frame;

a pair of transversely spaced implement support arms mounted on the frame at the front of the frame so as to support an implement at the front of the frame;

a speed control lever mounted in the cab having a handle which is manually operable for controlling a forward speed of the tractor, the handle having a first switch on a lefthand side of the handle and a second switch on a righthand side of the handle;

a spreader frame arranged for mounting on the implement support arms for support thereby so as to be transported on the tractor across the ground;

a tank for a fluid material to be distributed across the ground, the tank being mounted on the spreader frame;

a lefthand boom and a right-hand boom each mounted on the spreader frame so as to extend outwardly to a respective side of the tractor and including a plurality of material distribution nozzles at spaced positions along the length of the boom;

a lefthand lift member on the spreader frame for raising and lowering the lefthand boom;

a righthand lift member on the spreader frame for raising and lowering the righthand boom;

and a control system responsive to the lefthand switch for raising and lowering the lefthand boom and to the righthand switch for raising and lowering the righthand boom.

Preferably the tractor includes a swather attachment having a header for mounting on the implement support arms in replacement for the spreader attachment and a reel mounted on the header; the control system is arranged such that operation of one of the switches actuates raising and lowering of the header and operation of one of the lefthand and right-hand switches actuates raising and lowering of the header; the control system includes a supplementary control system of the spreader attachment cooperating with a master control system of the tractor; and there is provided a conversion switch for changing from a control system of the swather attachment to the supplementary control system of the spreader attachment.

Preferably the control system includes an electrical circuit actuated by the lefthand and righthand switches and an hydraulic circuit actuated by the electrical circuit.

Preferably each boom includes a main boom lift and a tip lift and wherein there is provided a further switch operable for changing operation of the lefthand and righthand switch between the boom lift and the tip lift.

BRIEF DESCRIPTION OF THE DRAWINGS

One embodiment of the invention will now be described in conjunction with the accompanying drawings in which:

FIG. 8A is an isometric view of the pivot mounting of the tip portion on an enlarged scale.

In the drawings like characters of reference indicate corresponding parts in the different figures.

DETAILED DESCRIPTION

Figure 1:
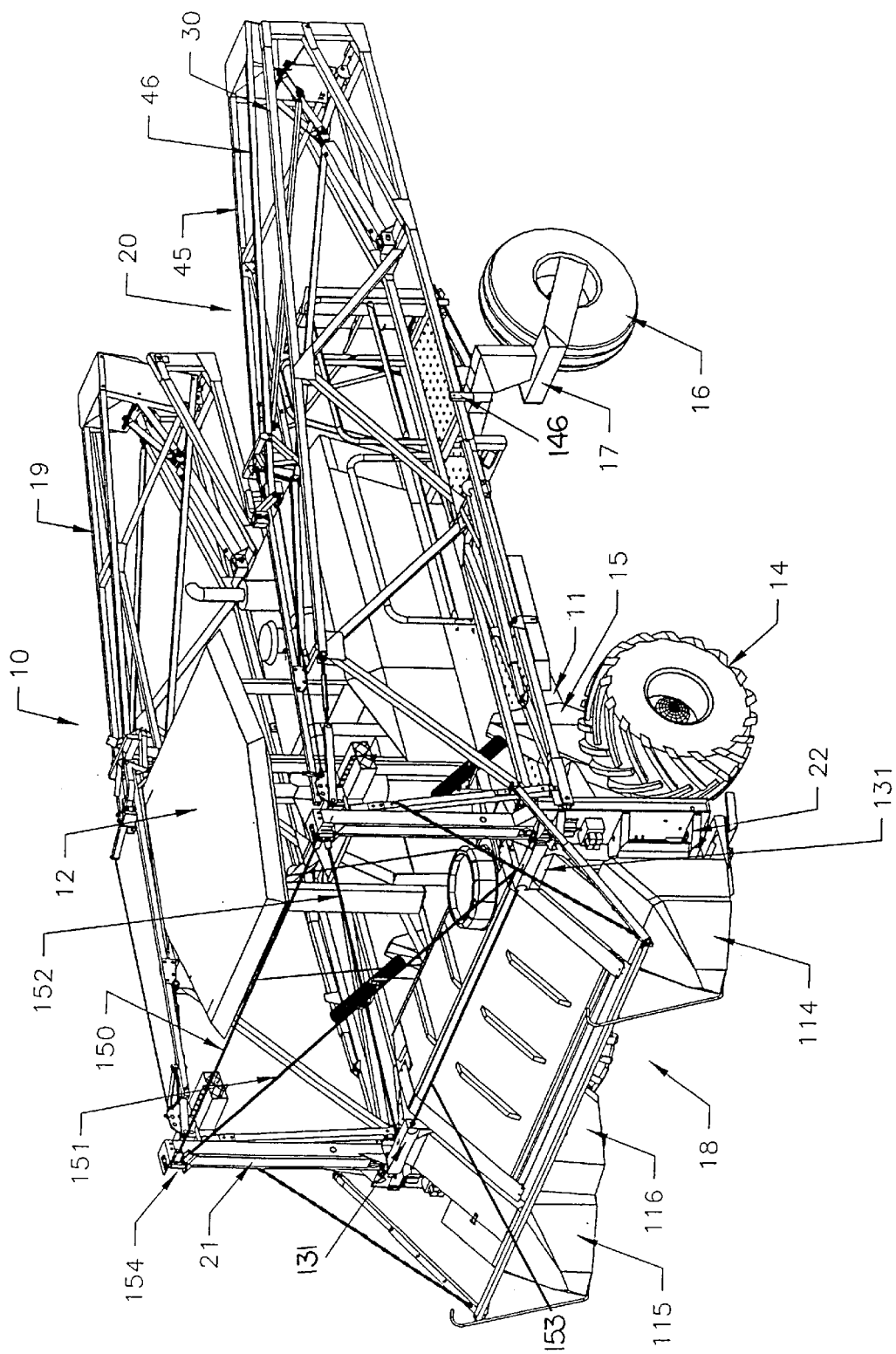
FIG. 1 is an isometric view showing a tractor and boom arrangement therefore in a first folded position of the boom.
Figure 2:
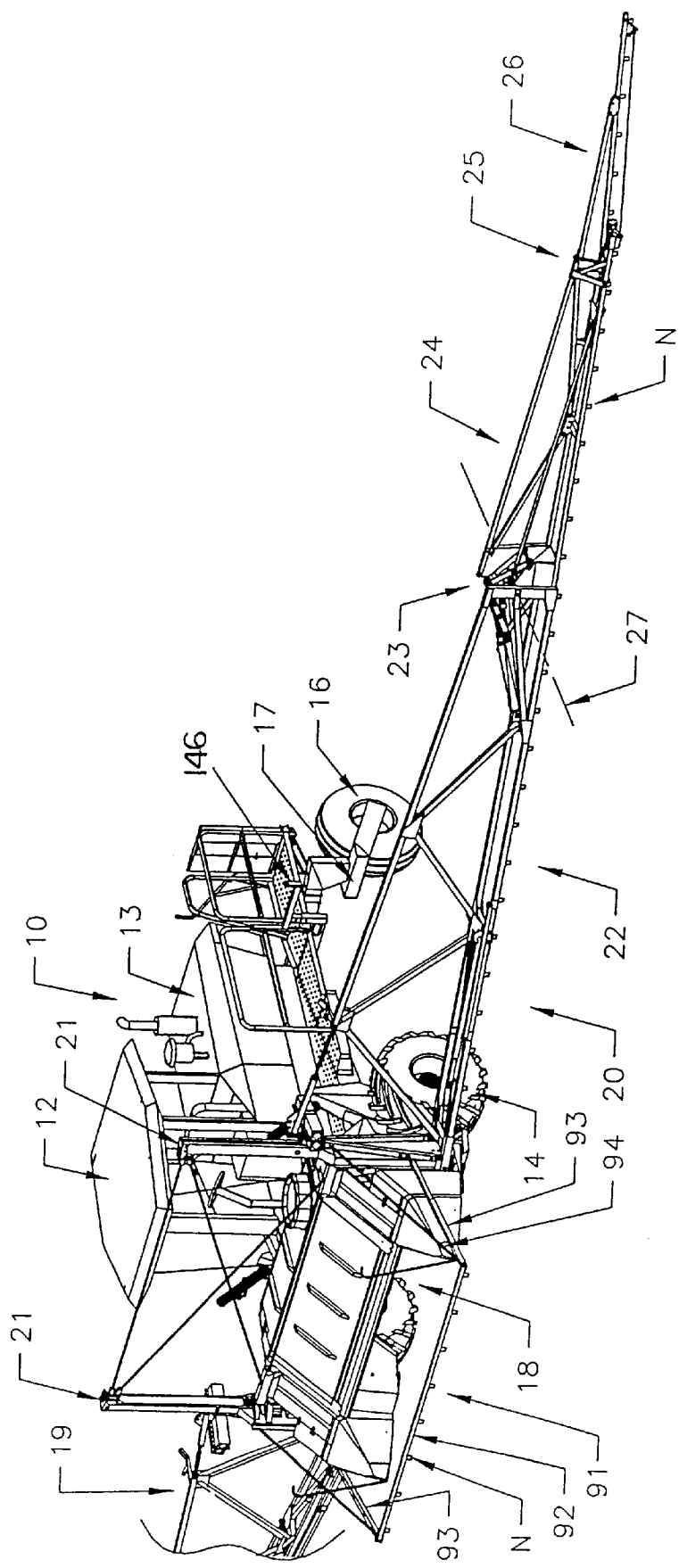
FIG. 2 is a similar isometric view on a smaller scale showing the booms in an extended position.

The tractor shown in FIGS. 1 and 2 is generally indicated at 10 and comprises a frame 11 supporting a cab 12 and an engine section 13. At the front of the frame is mounted a pair of front ground wheels 14 which are the type mounted on a support 15 which provide vertical suspension only by a relatively large pneumatic tires. The ground wheels 14 are driven by hydraulic motors so that steering of the tractor can be controlled by varying the speed of forward movement of one or other of the ground wheels 14. The rear ground wheels 16 are each mounted on a caster assembly 17 which allows free rotation about a vertical axis.

A type of tractor shown in FIGS. 1 and 2 is of the type used as a swather tractor and the tractor carries at the forward end (not shown) a pair of support arms for carrying a header for use in cutting a standing crop. The tractor therefore has a wide stance for conventionally allowing the formation of the swath between the ground wheels. Swather tractors of this type are widely known and are conventionally used only for carrying a header so that the arrangement of the present invention provides a conversion system for use of the conventional swather tractor in transporting a sprayer tank and booms for spreading or spraying fluid material over the ground.

An example of a tractor of this type is manufactured by the assignees of the present application which is MacDon Industries Ltd. A swather tractor of this type is generally designed for transporting a header and therefore has particular characteristics which indicate particular parameters for the sprayer boom assembly to be mounted on the swather tractor. In particular the swather tractor is relatively slow in view of the fact that its suspension is provided solely by the resilience of the pneumatic tires. Secondly the tires are relatively wide so that both of these characteristics indicate that the sprayer boom assembly should have as wide a width as possible so as to minimize the number of passes of the tractor across the ground and to maximize the amount of area covered in a single pass.

The sprayer assembly to mount on the tractor comprises a tank and frame section generally indicated at 18 which are not particularly described herein as they are described in more detail in a co-pending application filed simultaneously herewith.

The present application is particularly concerned with the construction of the booms and thus the following description relates particularly to this area and describes in detail the construction of each of the booms.

Thus on the tank and frame section 18 is mounted a pair of booms 19 and 20. Each boom is mounted upon a respective one of a pair of masts 21 carried at a respective side of the tank and frame section 18. Each mast 21 is mounted for rotation about a vertical axis on a pivot support assembly 129 carried on the section 18. Thus each mast can rotate between the field position shown in FIG. 2 and the transport position shown in FIG. 1. This rotation thus requires movement through substantially 90° so that the booms move from the outward position shown in FIG. 2 to the folded position along side the side of the tractor as shown in FIG. 1.

Each boom comprises an inner section 22 extending from the mast 21 to a central joint 23, an outer section 24 extending from the joint 23 to a second joint 25 and a tip portion 26. In general, in the position shown in FIG. 2, the three sections defined by the inner section 22, the outer section 24 and the tip portion 26 are arranged collinear and extending outwardly to the side of the tractor. In the position shown in FIG. 1, the outer section 24 and the tip portion 26 are folded inwardly about a horizontal axis 27 so the tip portion is moved inwardly to a position lying on top of an inner end of the inner section and particularly upon a cradle 59. Thus in effect the boom is folded in half with the inner section and the outer part of the boom defined by the outer section 24 and the tip portion 26 being arranged to intermesh. The folded boom is then moved inwardly to the position shown in FIG. 1 and supported upon a cradle 146 carried on the side of the tractor rearwardly of the mast 21.

The boom can also move vertically along the mast from a lowered spraying position shown in FIG. 2 to a raised position. The height of the boom can therefore be varied for spraying at different heights depending upon the crop condition. The transport position is achieved while the boom is in the raised height as shown in FIG. 1.

Figure 3:
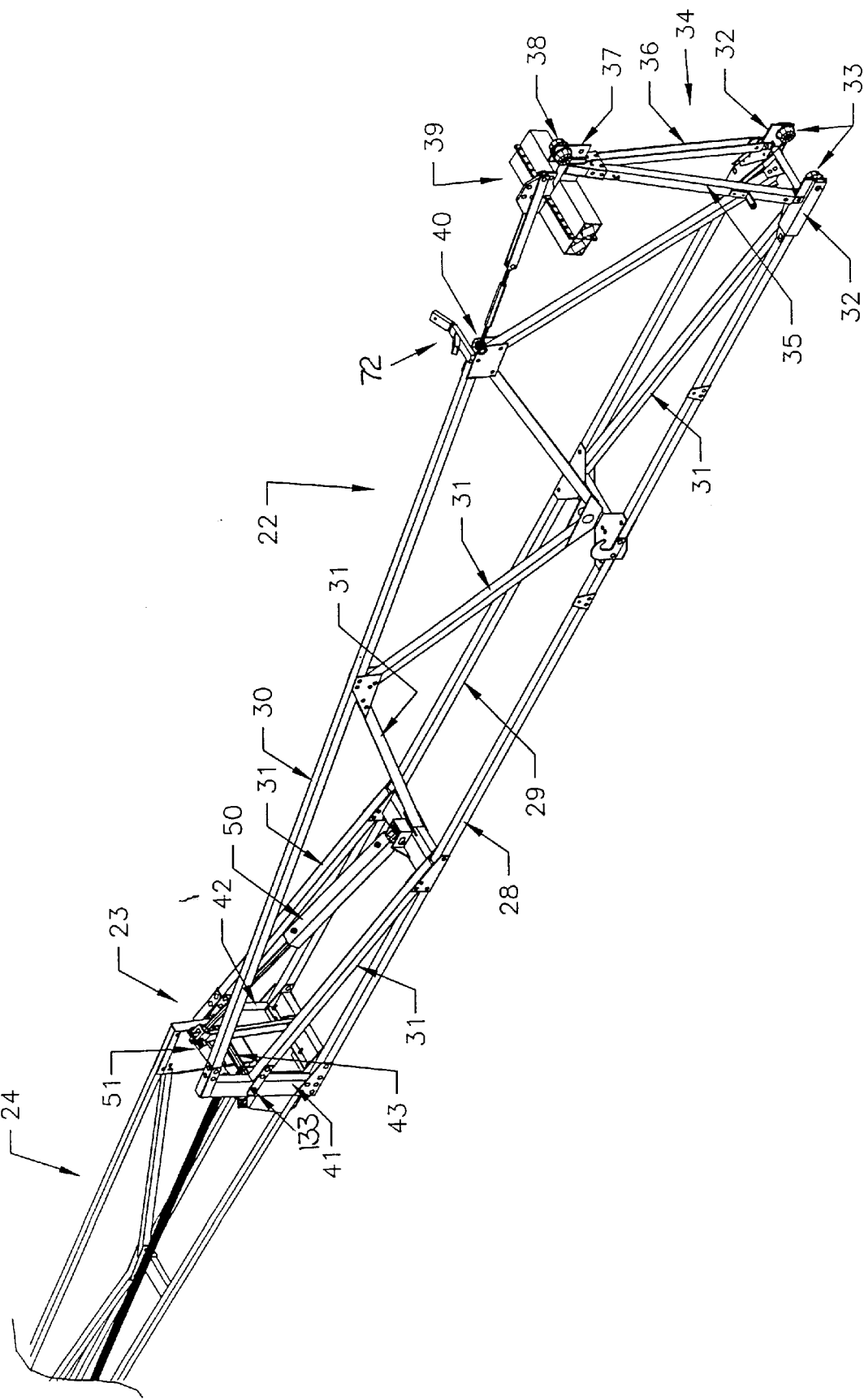
FIG. 3 is an isometric view on an enlarged scale on an inner part of one of the booms and the junction between the inner and outer parts.
Figure 4:
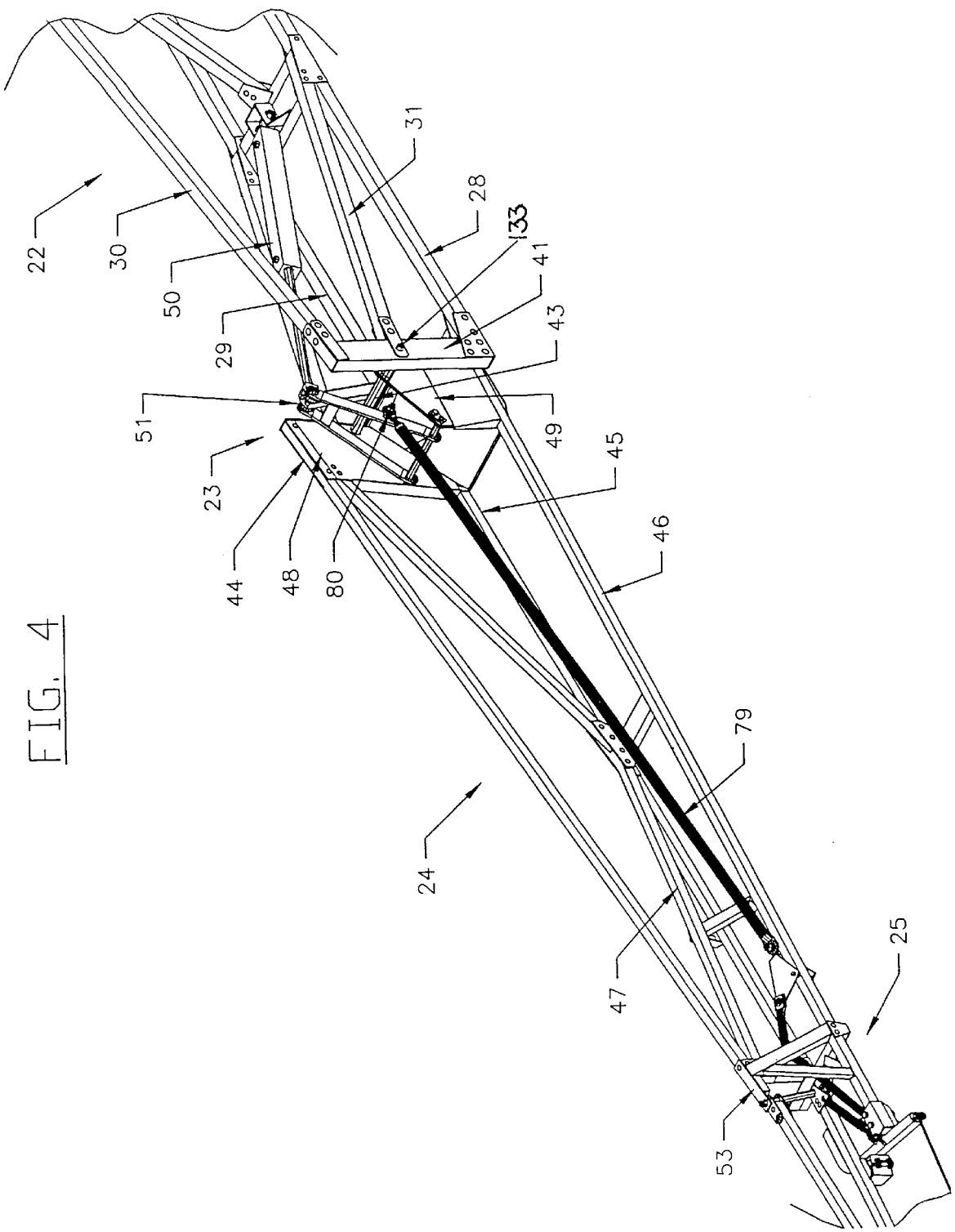
FIG. 4 is an isometric view on the same scale as FIG. 3 showing an outer part of the boom of FIG. 3 and the junction between the inner and outer parts.
Figure 5:
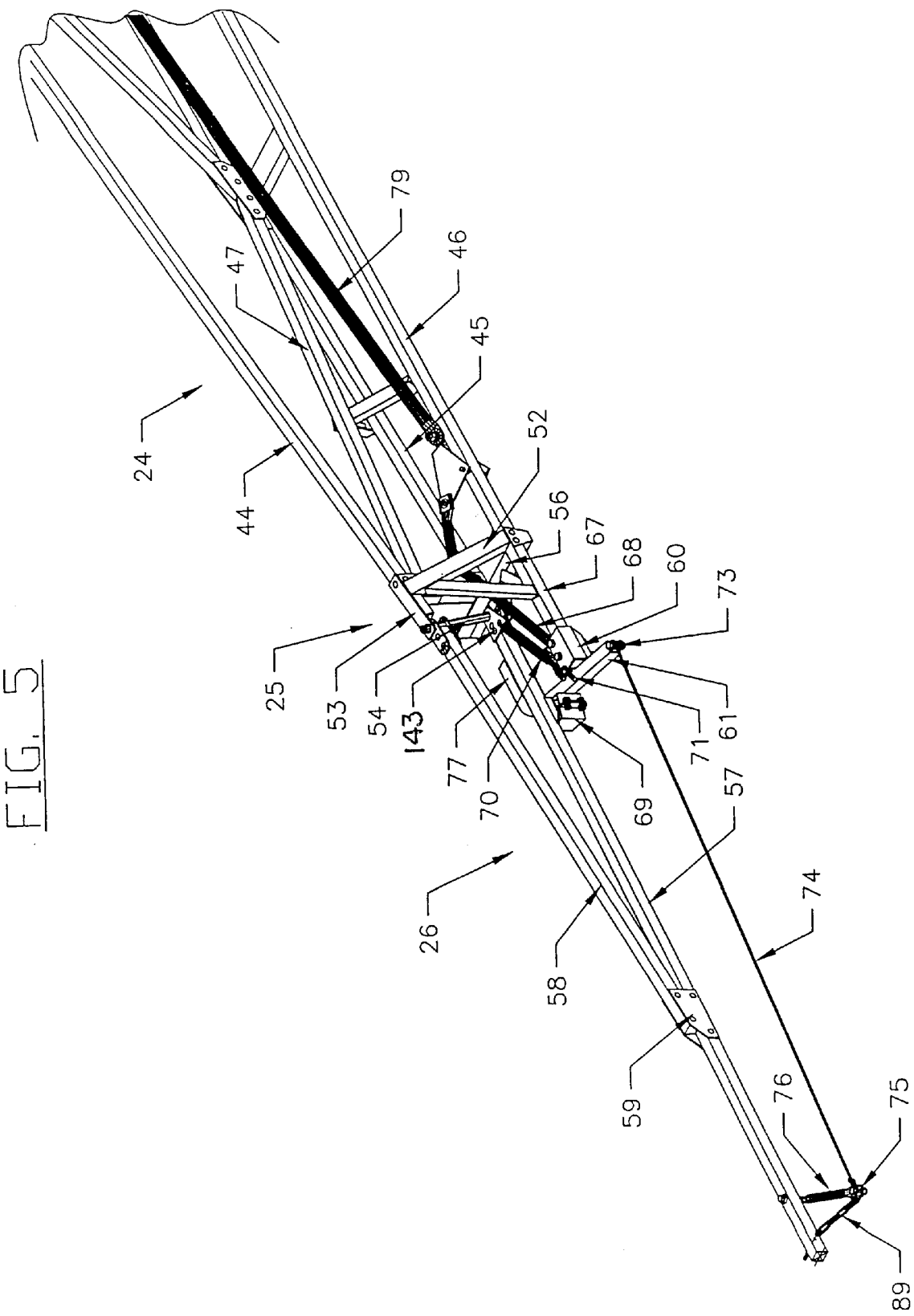
FIG. 5 is an isometric view on the same scale as FIG. 3 showing the outer end of the outer part of the boom and a break-away tip portion mounted on the outer end.

The construction of the boom is shown in more detail in FIGS. 3, 4, and 5. Each of the inner, outer and tip sections is formed generally as a triangular truss using square tubing. Thus the inner section 22 comprises a pair of bottom rails 28 and 29 which are parallel and lie in a common horizontal plane together with a top rail 30 which is located generally between the bottom rail and to the height above the bottom rails. The rails are interconnected by a series of diagonal braces 31 which are arranged in accordance with good engineering practice to provide the required structural strength for the truss.

At the inner end of each of the bottom rails 28 and 29 is provided a mounting bracket 32 for attachment to the mast 21 of the main frame. The mounting bracket 32 provides a pair of inwardly projecting flanges each carrying a roller 33 for vertical rolling movement in a respective one of a pair of channels on the mast. On top of the flanges of the mounting brackets is provided a standard 34 defined by two braces 35 and 36 each of which is pivotally mounted at the lower end to a respective one of the brackets 32 for pivotal movement about a horizontal axis transverse to the bottom rails. The braces 35 and 36 converge to an upper bracket 37 at which is mounted a pair of rollers 38 each arranged on a respective side of a vertical flange of the bracket. The mast includes a further pair of upper guide channels for receiving the rollers 38 with the upper channels of the mast being arranged face-to-face so as to receive the rollers there between.

Thus the whole of the boom can move upwardly and downwardly along the vertical extent of the mast with the upper rollers moving in an upper half of the mast and the lower rollers moving in a lower half of the mast with the mast being approximately twice the height of the standard 34.

Between the bracket 37 and the top rail 30 is provided a suspension spring arrangement 39 which allows extension and retraction of a coupling member joining the bracket 37 to the inner end of the top rail 30 as indicated at 40. The spring thus allows upward and downward pivoting movement of the boom relative to the mast. The spring is arranged to provide energy absorption so as to effect a dampening action on the suspension of the boom.

The top rail 30 commences at a position substantially mid-way between the two bottom rails 28 and 29 so that the triangle defined by the standard 34 is approximately an isosceles triangle. However the rail extends then from the central position at each upper end to a position vertically above the bottom rail 28 where it is attached to a vertical post 41 at the joint 23.

The joint 23 further includes a second post 42 mounted at the outer end of the bottom rail 29 and standing upwardly therefrom. The posts 41 and 42 are braced by two of the braces 31 which extend to a position at the top of the post 42 and a position part way up the post 41. At the top of the braces 31 is provides a pivot tube 43 which contains a shaft 133 which defines a pivot for the joint and mounts the inner end of the outer section 24.

The outer section 24 is similar to construction that it includes two bottom rails 45 and 46 and a top rail 44. The rails are formed into a truss section by interconnecting braces 47. At the inner end of the outer section is provided a pair of posts 48 and 49 each mounted above a respective one of the bottom rails 45 and 46. The top rail 44 at its inner end is connected to the post 48 and extends outwardly therefrom to an outer end located mid-way between the bottom rails 45 and 46. The pivot shaft 133 pivotally passes through the posts 48 and 49 so as to allow the posts 48 and 49 to rotate about the pivot shaft 133 in a pivotal action.

The inner end of the rails 45 and 46 and the posts 48 and 49 are located inside the outer end of the rails 28 and 29 and the respective posts 41 and 42. The height of the posts is arranged so that the outer portion 24 can fold inwardly about the axis of the pivot shaft 133 from the collinear position shown in FIGS. 2, 3, and 5, through the partly folded position shown in FIG. 8 to the folded position shown in FIG. 1. In the folded position, the bottom rails 45 and 46 lie along side the top rail 30. Also in the folded position 44 lies adjacent the bottom rails 28 and 29.

The pivotal movement is effected by a cylinder 50 acting upon a four bar linkage arrangement 51 which is of a conventional construction and actuates a pulling movement on the outer section which is communicated through the posts 48 and 49. The construction of the linkage 51 is well known to one skilled in the art and therefore will not be described in detail.

Turning now to the junction 25 between the outer portion 24 and the tip portion 26 as shown best in FIGS. 4 and 5, this comprises a triangular standard 52 defined by upwardly and inwardly inclined braces connecting between the bottom rails 45 and 46 and an apex at the top rail 44. At the apex of the standard 52 is provided a support bracket 53 which extends outwardly beyond the end of the top rail 44 and defines a top support for a bearing tube 54 containing a pivot shaft 134. A bottom support bracket for the shaft 134 is provided as a plate 55 on the bottom rail 45. The plate 55 is arranged at a transverse beam 56 of the triangular standard 52 while the bracket 53 extends outwardly of that position thus supporting the bearing tube 54 at an angle of the order of 15° from a vertical plane transverse to the length of the boom. The bearing shaft 134 also stands in a vertical plane longitudinal of the boom and defined by one vertical leg of the triangular standard 52.

The tip portion 26 comprises a main horizontal rail 57 and an inclined 25 upper rail 58. The rails thus have their inner ends connected to the bearing tube 54 at opposite ends of the pivot shaft while the rails converge to an apex 59 part way along the horizontal rail 57.

The boom therefore defines a substantially collinear bottom rail which can be used to support a series of material distribution nozzles at space positions along the length of the boom for distribution of a fluid material from the supply tank across the area of the ground covered by the forward movement of the boom.

Figure 6:
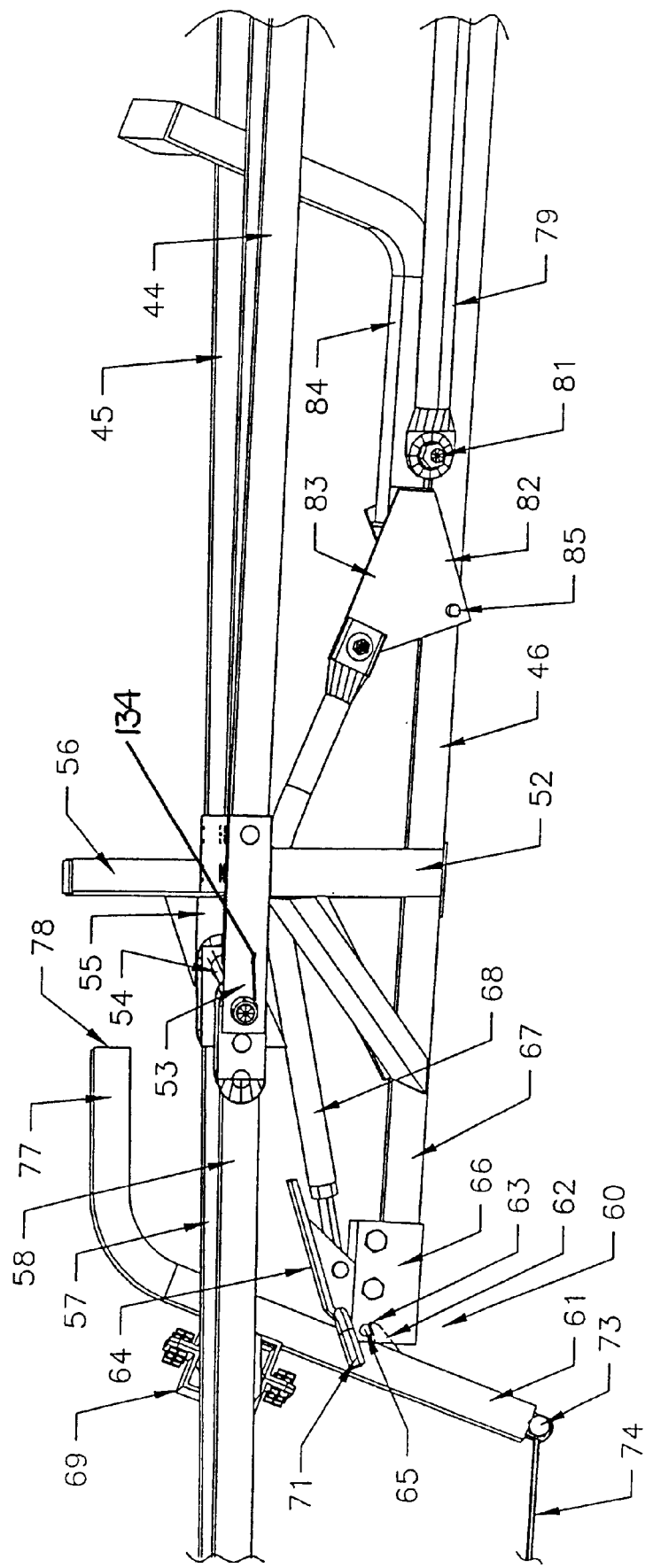
FIG. 6 is a top plan view on an enlarged scale showing the joint between the outer end of the outer section and the tip portion in the collinear position.
Figure 7:
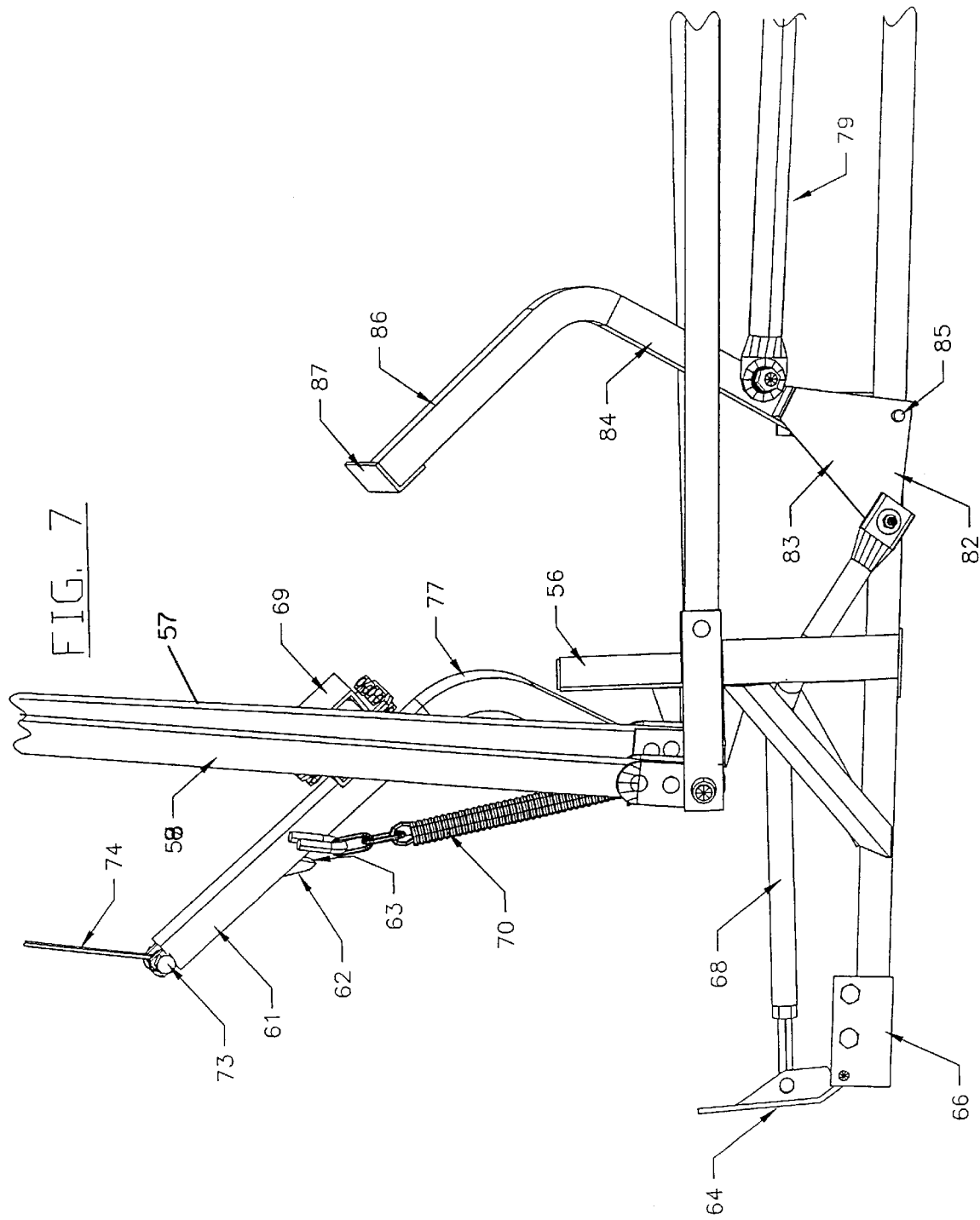
FIG. 7 is the same top plan view as that of FIG. 6 showing the tip portion in the retracted position during a folding action.
Figure 8:
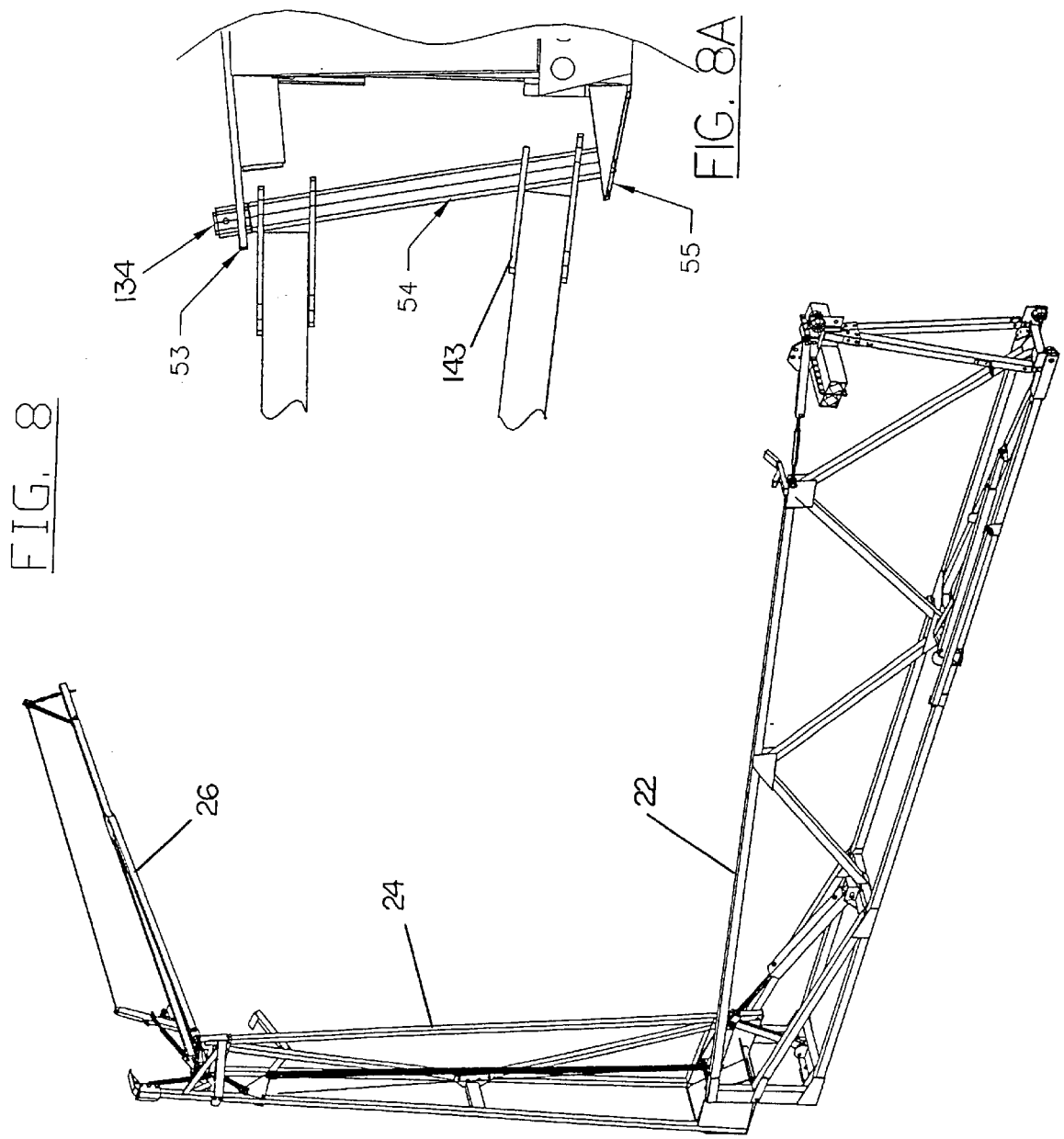
FIG. 8 is an isometric view similar to that of FIG. 3 showing the boom in a part folded position.

The tip portion 26 can thus pivot about the pivot shaft 134 from the collinear position shown in FIGS. 5 and 6 to a retracted position shown in FIGS. 7 and 8. This pivotal movement can be effected in response to impact with an obstacle while the tip portion is in the working position or can be effected as part of the folding action. In view of the inclination of the bearing tube 54, the center of gravity of the tip portion rises as the tip portion pivots rearwardly from the collinear position so that it tends to fall back to the collinear position under gravity.

The tip portion is latched in the collinear position by a latch generally indicated at 60. The latch 60 includes a latch cushion arm 61 which carries a latch abutment 62 having an angled front face 63 for engaging against a latch jaw 64. The latch jaw is pivotally mounted upon a shaft 65 carried on a support block 66 at the end of an extension portion 67 of the bottom rail 46. The latch jaw 64 is normally held fixed in place by a control arm 68 so that the latch jaw is normally stationed during operation of the boom in the working position.

The cushion arm 61 is pivotally mounted on the bottom rail 57 by a spring pivot mounting 69 which allows the cushion arm to rotate about a vertical axis at right angles to the rail 57 while allowing some side-to-side flexing movement.

The cushion arm is biased into a latching position by a coil spring 70 mounted upon a hook 71 on the cushion arm and attached at the other end to the plate 143. For convenience of illustration, the spring 70 is omitted from FIG. 6.

The cushion arm 61 is also biased to the latching position by the spring action of the spring pivot 69.

The cushion arm 61 extends forwardly from the latch block 66 to a forward end which carries a coupling 73 for a cable 74. The cable extends from the coupling 73 to a similar coupling 75 at a forward end of a support arm 76 which is held at a fixed angle relative to the rail 57 by a chain 77. Thus the cable 74 lies in a common horizontal plane with the rails 57 and is located forwardly of and parallel to the rail 57 so as to impact any obstacle prior to the tip portion as the tip portion and the boom move forwardly across the ground.

Figure 9:
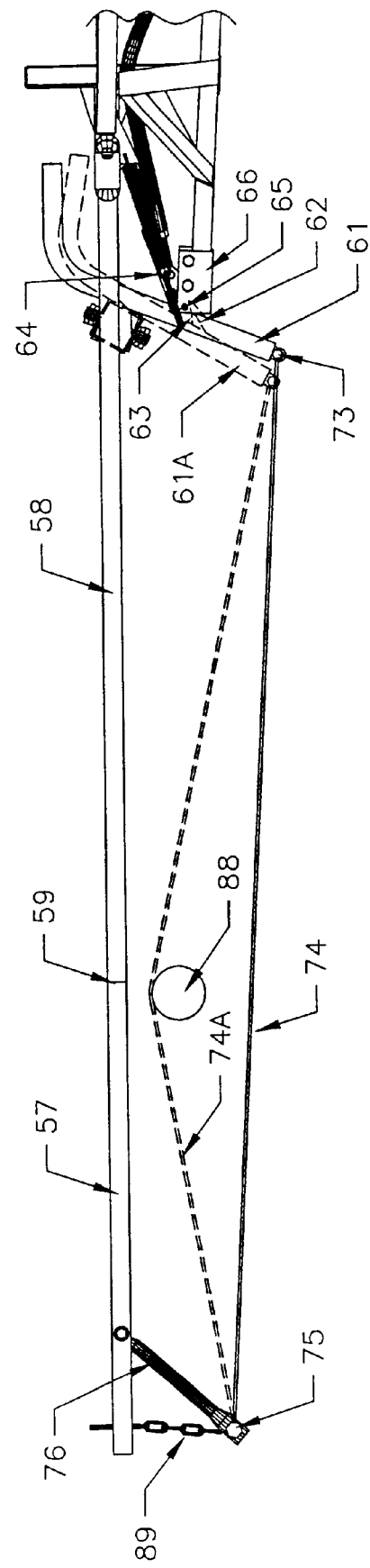
FIG. 9 is a top plan view of the tip portion showing the impact of the tip portion with an obstacle.
Figure 10:
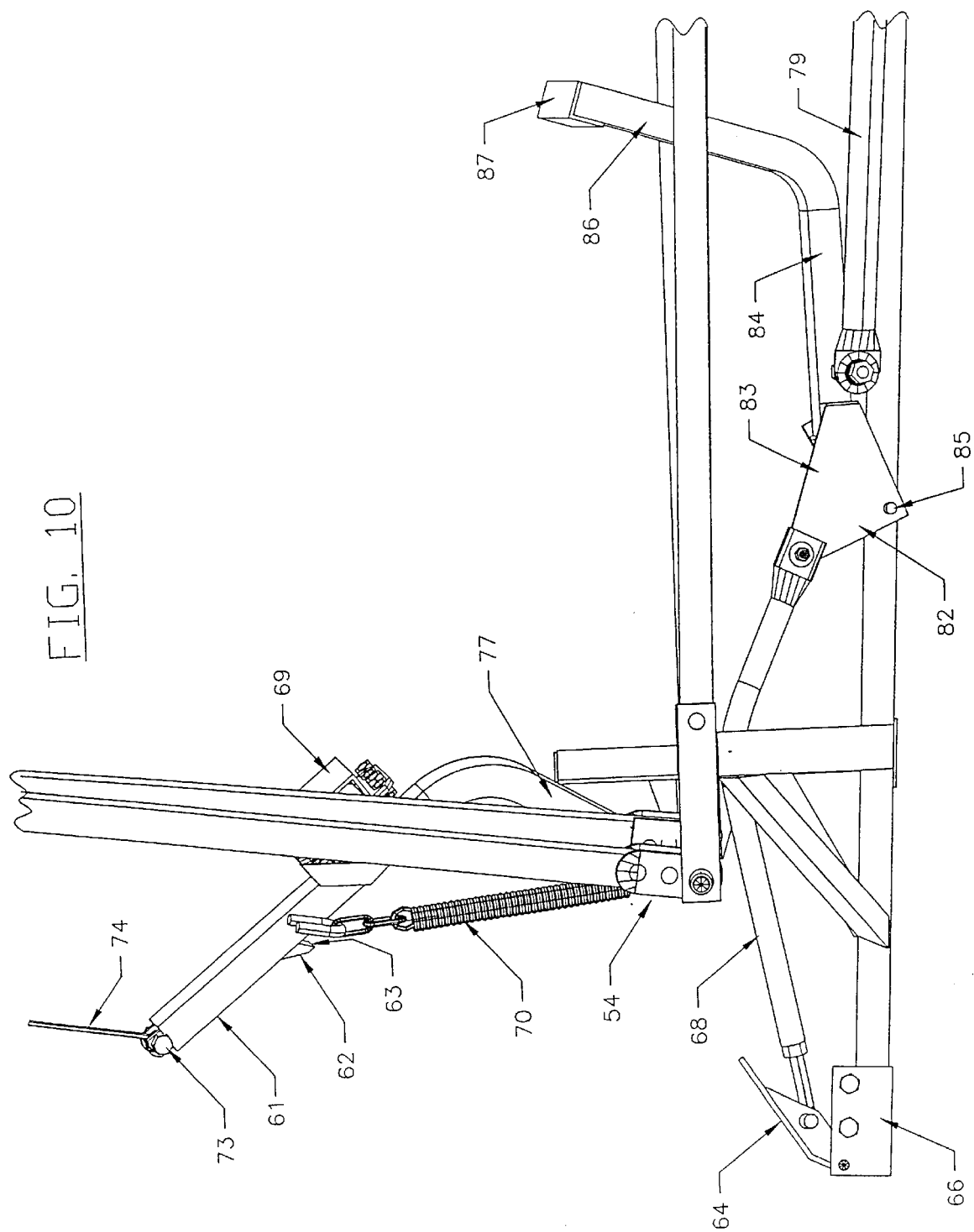
FIG. 10 is the same top plan view as that of FIG. 7 showing the tip portion in the retracted position after an impact with an obstacle.

In operation of the tip portion during normal working action of the boom, as best shown in FIG. 9, an obstacle 88 impacts the cable 74 at a point along its length thus pulling the cable 74 rearwardly to take up an angle position as indicated at 74A. This deflection of the cable applies a pulling action on the cushion arm 61 so as to move the cushion arm 61 to a retracted position indicated at 61A. This pulls the latch abutment 62 and its incline surface 63 away from the latch jaw 64 thus unlatching the tip portion from the latch block 66 and allowing the tip portion to pivot rearwardly about the pivot shaft 134. Forces are applied to the tip portion in the rearward pivoting direction by the distortion of the table so the cable tends to provide a pulling action away from the obstacle and also by the forces in the spring coupling 69 which tends to resist the movement of the cushion arm 61.

These forces are arranged so they are sufficient generally to prevent the obstacle reaching the tip portion itself before the tip portion is rapidly accelerated rearwardly away from the obstacle. It will be appreciated that impact of the cable 74 of the tip portion with an obstacle can be effected at a higher speed than the normal forward speed of the vehicle since the operator will tend to steer away from an obstacle when realizing that the boom is too close thus accelerating the outer end of the boom. In this way a nominal forward speed of 10 to 15 miles per hour can lead to an impact speed of greater than 20 miles per hour. For this reason the cable arrangement prevents any impact of the tip portion itself with the obstacle thus absorbing the impact forces within the springs of the system rather than on the tip portion itself.

At the same time the positive latching arrangement which normally holds the tip portion against rearward retracting movement provided by the engagement between the latch abutment 62 and the jaw 64 prevents the tip portion from moving unstably as the boom swings during steering movements or acceleration of the vehicle.

The cushion arm 61 also includes a trailing end portion 77 which projects to the opposite side of the rail 57 and then turns in a direction generally parallel to the rail 57 behind the rail 57. This portion 77 acts as a stop to limit and to restrict the rearward retracting movement of the tip portion. It can be appreciated that the tip portion when impacted as described previously will accelerate rapidly in the rearward retracting direction and it is necessary therefore to absorb the energy of the retracting movement to prevent damage to the elements of the system. This energy absorption is effected by impacting of the end 78 of the portion 77 with the rearward projecting extension of the cross beam 56. This impact causes severe distortion of the spring coupling 69 and causes further extension of the spring 70 so that the energy is absorbed into the spring elements and the movement of the tip portion halted without damage.

Once the obstacle is cleared, the cushion arm is pulled back to its working position by the spring 70 and by the spring resilience in the coupling 69 and the tip portion is pulled back to its working position by gravity so both parts return to the working position for continued working operation.

The latch 64 can also be operated by movement of the latch control arm 68. The latch control arm is moved generally longitudinally of the boom by a push rod 79 connected to the linkage 51. Thus actuation of the cylinder 50 gradually pushes an inward end 80 of the arm 79 on the linkage 51 outwardly as the linkage is actuated to pivot the outer section 24 to the folded position. An outer 81 of the push rod 79 is mounted upon a pivot member 82 in the form of a triangular plate 83 which is attached to an arm 84. The triangular plate 83 is mounted for pivotal movement about a rod 85.

The arm 84 includes a cranked section 86 with an abutment end 87 for engaging the bottom rail of the tip portion when the tip portion is in the retracted position shown in FIG. 7 and the arm is moved forwardly for returning the tip portion to the extended position.

In operation as best seen in FIGS. 6, 7, and 8, actuation of the folding mechanism defined by the cylinder 50 and the linkage 51 causes a pushing movement on the push rod 79 and therefore on the latch control arm 68. The linkage is arranged so that the movement of the latch jaw 64 only commences after the outer section 24 has been raised by an angle of the order of 15°. At this time the pushing action pushes the latch jaw 64 forwardly so that it releases from the surface 63 and pushes the cushion arm 61 with the pushing force acting longitudinally of the boom thus tending to pivot the tip portion about its pivot shaft 134. Thus the pushing action starts the tip portion in pivotal movement around the pivot shaft 134 from the latch position from which it has been released, rearwardly toward the retracted position. This movement is continued by the action of gravity so that the tip portion gradually tilts rearwardly to the retracted position as the outer section 24 gradually rises in the folding action.

In the position shown in FIG. 7, therefore, the latch jaw 64 has been moved to its outermost position and the tip portion has pivoted around to the retracted position generally at right angles to the center section until the cushion arm 61 of the tip portion engages the end portion 56 of the beam 52.

The retracted position is thus achieved at an angle of approximately 45° of the movement of the outer section 24 and the retracted position is maintained until the outer section reaches an angle of movement of the order of 135°. During this time, therefore, the tip portion lies at right angles to the outer section thus reducing the maximum height of the boom as it is folded by the length of the tip portion. In an example where the boom is 90 feet in length so that the outer section including the tip portion is approximately 20 feet in length, the retraction of the tip portion ensures that the maximum height of the boom as it falls does not exceed 20 feet, which is generally sufficient to ensure that it does not contact electrical power lines.

When the folding action of the outer section reaches the position at approximately 135° of movement, the continued pushing action on the push rod 79 pushes the triangular plate 83 over center relative to the pivot 85 so that control arm 68 is then retracted back along the boom away from the block 66 to again pull the latch jaw 64 back to its original latching position. At the same time the arm 84 and the abutment 87 are pushed forwardly, causing the tip portion to be pushed around the pivot shaft 134 back toward to the collinear position. This pushing action causes the tip portion to pivot outwardly again to take up the collinear position in which it is latched by engagement of the latch abutment 62 with the latch jaw 64.

In the collinear position, the folding action to the fully folded position is continued until the tip portion rests upon the cradle 56 with the cushion arm absorbing the motion and avoiding the necessity of accurate adjustment.

After completing the inward folding action of the boom, the mast 21 is then pivoted as previously described to move the whole boom to the folded position shown in FIG. 1.

It will be appreciated that the particular arrangement of the folding linkage and the actuation system which then actuates the movement of the tip portion as shown and described herein is only exemplary and alternative arrangements for obtaining these movements can be designed and used. In addition the latch arrangement can also be modified.

Figure 11:
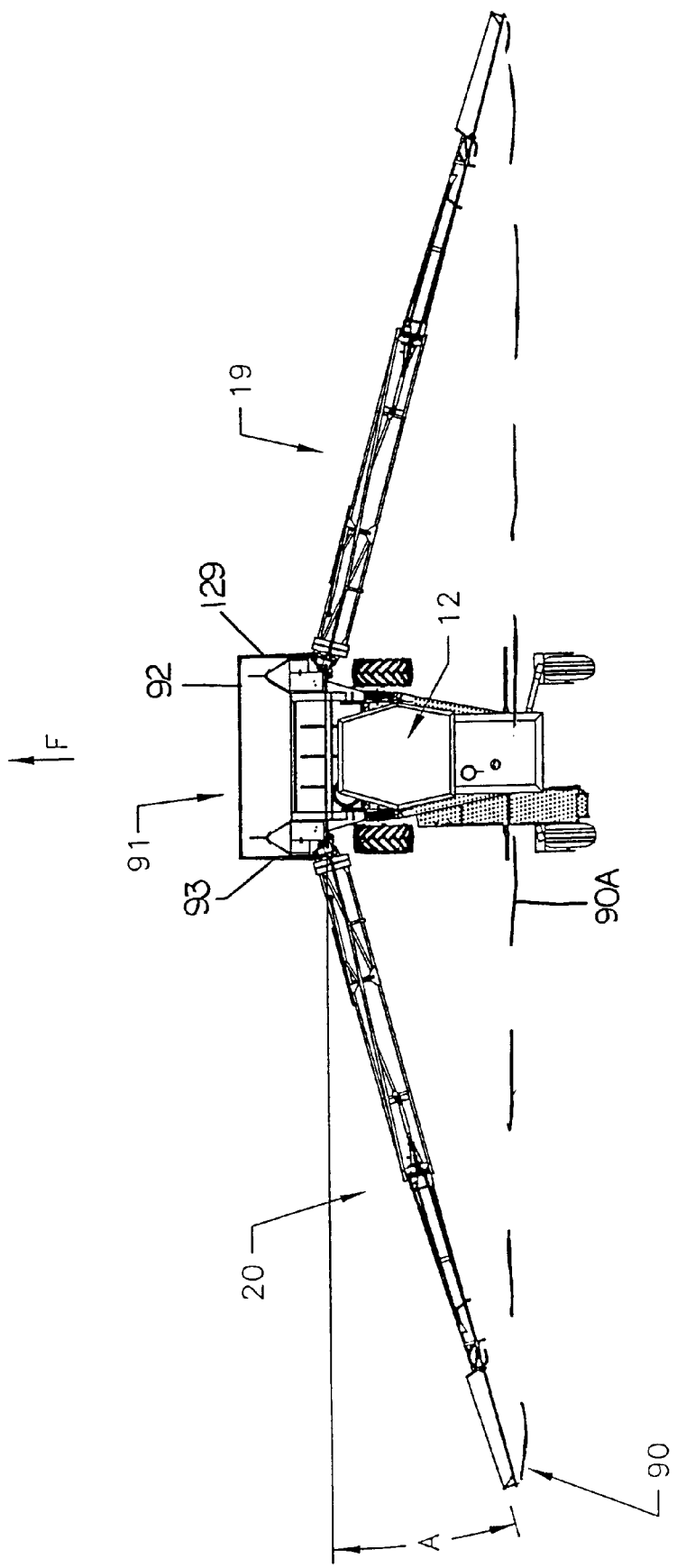
FIG. 11 is a top plan view of the tractor and boom arrangement of FIG. 1 in the extended position of the booms.
Figure 12:
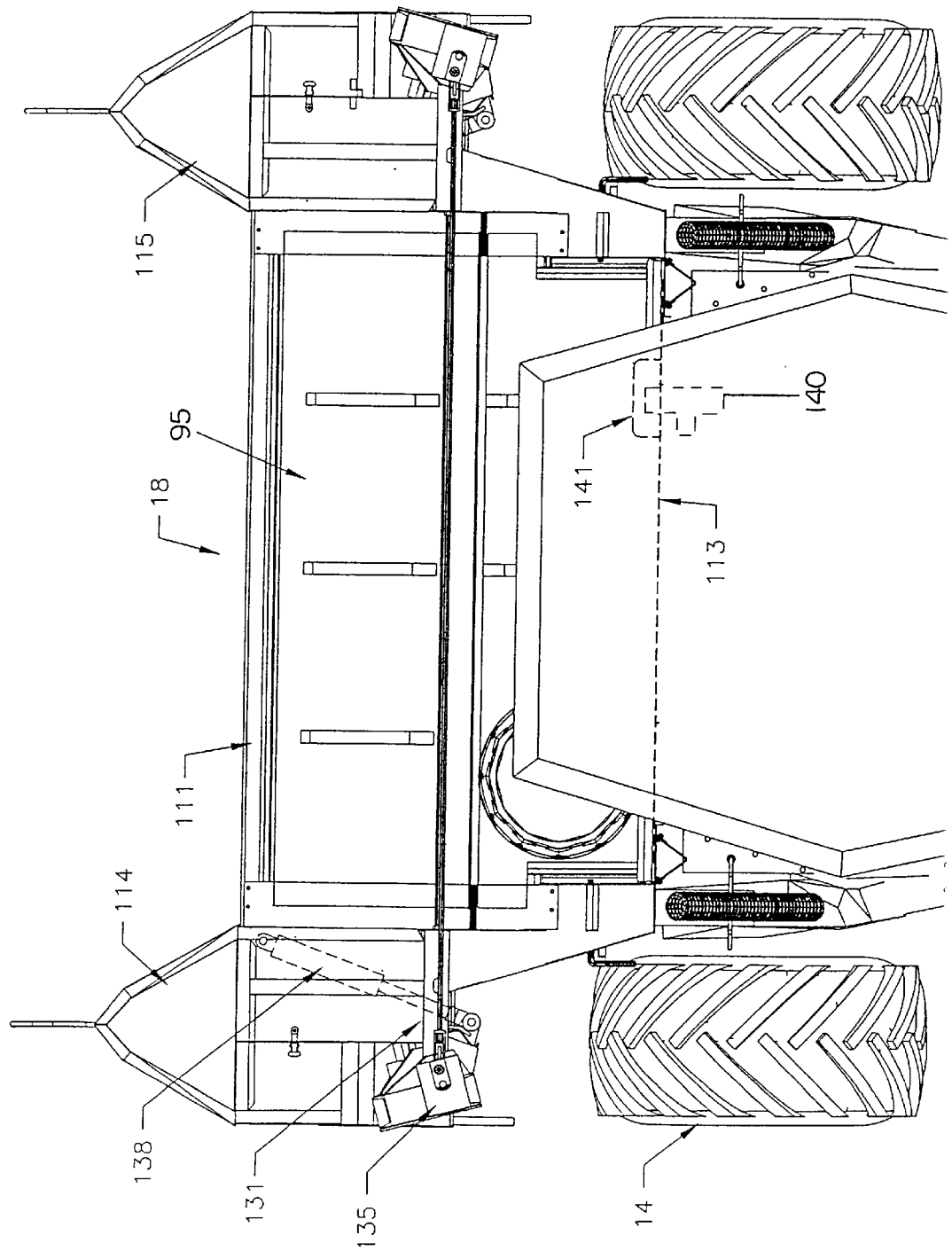
FIG. 12 is a top plan view of a forward part only of the tractor and the attachment with the booms omitted for convenience of illustration.
Figure 13:
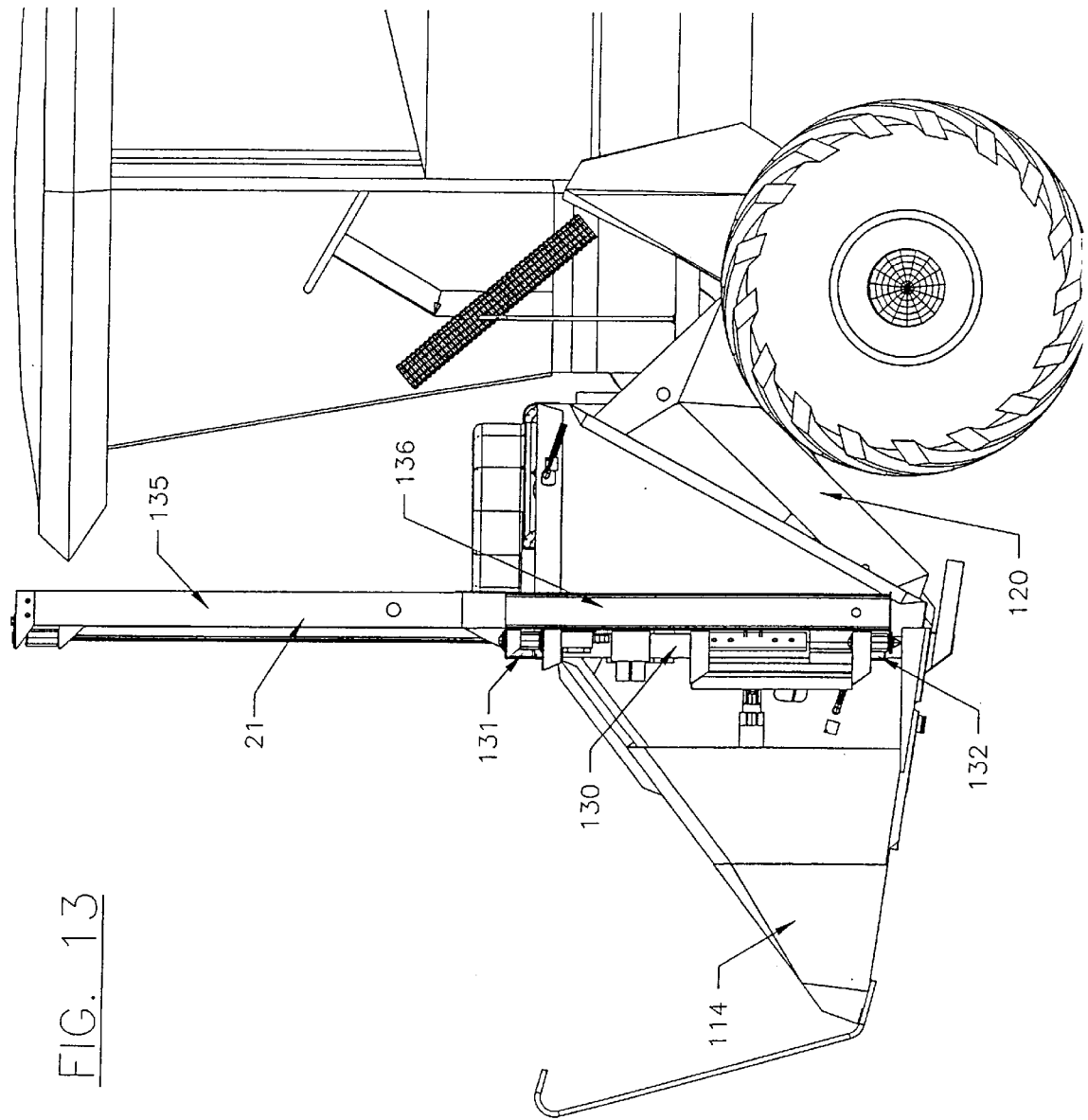
FIG. 13 is a side elevational of the part of the tractor and attachment shown in FIG. 12 showing the mast in the transport position.

The tractor and sprayer attachment is shown in top plan view in FIG. 11 which shows the booms 19 and 20 mounted on the masts 21. Pivotal movement of the booms about the vertical axis defined by the mounting assembly 129 of each boom is effected between the retracted position shown in FIG. 1 and the extended position shown in FIGS. 2 and 11. As particularly shown in FIG. 11, the pivotal movement to the extended position is limited to an angle of the order of 75° so that in the extended position both booms extend outwardly and rearwardly relative to the forward direction F of the tractor through an angle A which is of the order of 15°. In this way the inner end of the boom at the mast 21 is positioned forwardly of the front wheel 14 and forwardly of the cab 12 whereas the outer end 90 lies along a line 90A joining the outer ends, which line is rearward of the cab 12 and rearward of the front wheels 14. This rearward inclination of the boom has two significant advantages. Firstly the center of gravity of the boom is moved rearwardly relative to the mast 21 thus moving the center gravity of the whole of the attachment rearwardly relative to where it would otherwise be if the booms were right angles to the direction F. Secondly the positioning of the boom so the inner end at the mast 21 is forward of the cab and the outer end 90 is rearward of the cab provides an improved ability to view each of the nozzles end of the boom and to distinguish that nozzle from the other nozzles. Thus if the boom lies directly along a line of site of the operator, the nozzles cannot be individual distinguished to see whether each of the nozzles is properly operating. However with the boom inclined rearwardly in the manner disclosed, the boom lies at a sufficient angle that to see if e nozzles can be viewed to see if it is independently operating for corrective action to be taken in the event that one or more nozzles fails. The positioning of the mast 21 as far rearwardly as possible brings the position of the mast immediately in front of the cab and to respective sides of the cab.

As shown in FIGS. 2 and 11, the boom of the attachment includes the two side booms 19 and 20 together with a front boom section 91 which comprises a beam mounted to extend across the front of the attachment between the two side booms 19 and 20. The beam 92 is supported by a pair of rearwardly extending parallel beams 93 each of which is pivotally attached to one brace 35 of the respective boom so as to extend forwardly therefrom. A flexible connection in the form of a cable or chain 94 extends from the mast forwardly and downwardly to connect to the beam 93 adjacent to the forward end. The beam 92 is therefore free to lift upwardly if impacted by an obstacle but is held at a height determined by the height of the booms. As the booms can be adjusted in height individually, as described in more detail hereinafter, each end of the beam 92 takes up a height which is determined by the height of the adjacent boom. Thus if one boom is raised to clear an obstacle or in view of changing ground height, the front boom section 91 takes up an inclined orientation with one end at the height of the raised boom and the other end at the height at the opposite boom.

Figure 16:
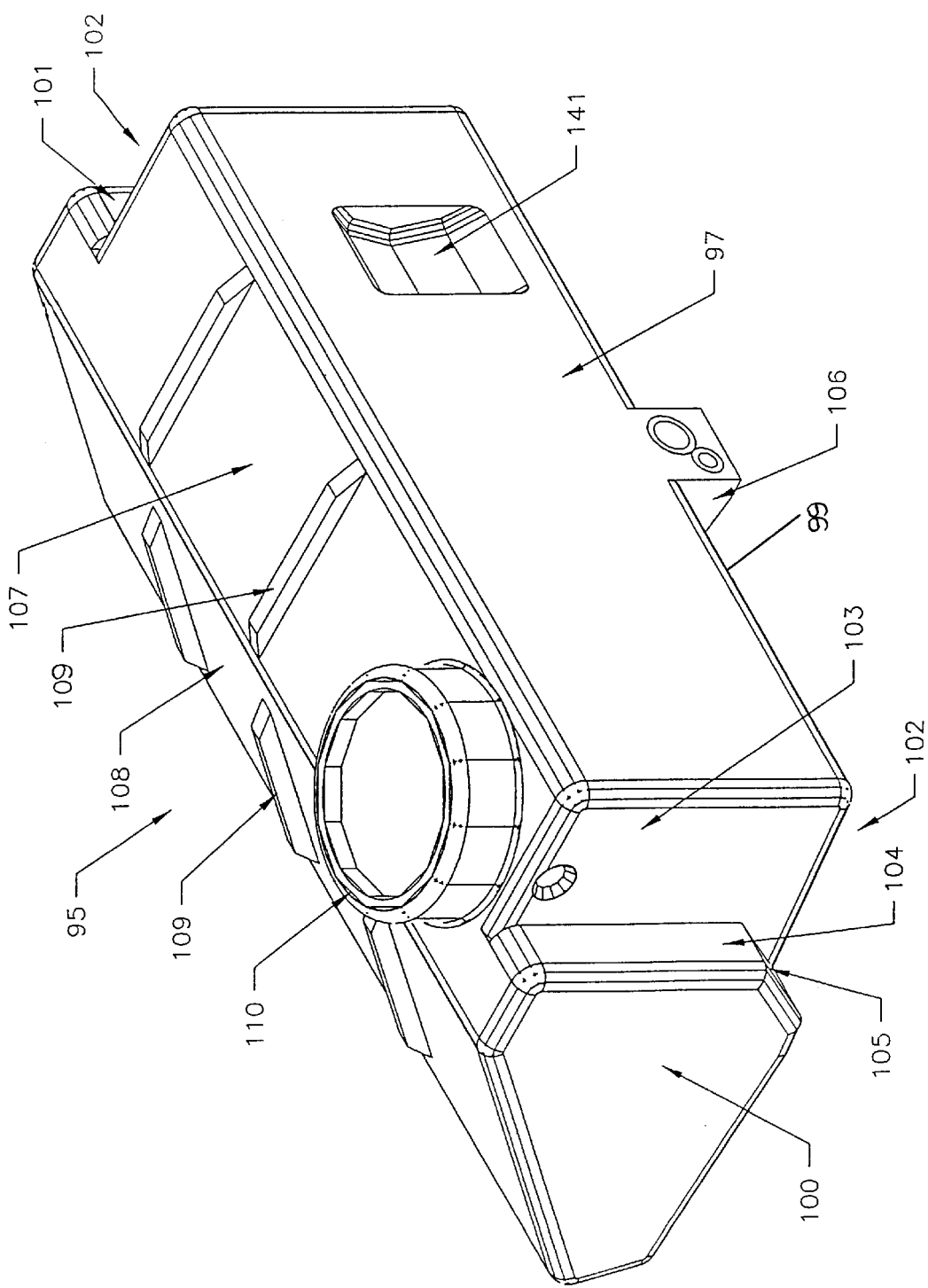
FIG. 16 is an isometric view from the front and one side of the tank of the attachment.
Figure 17:
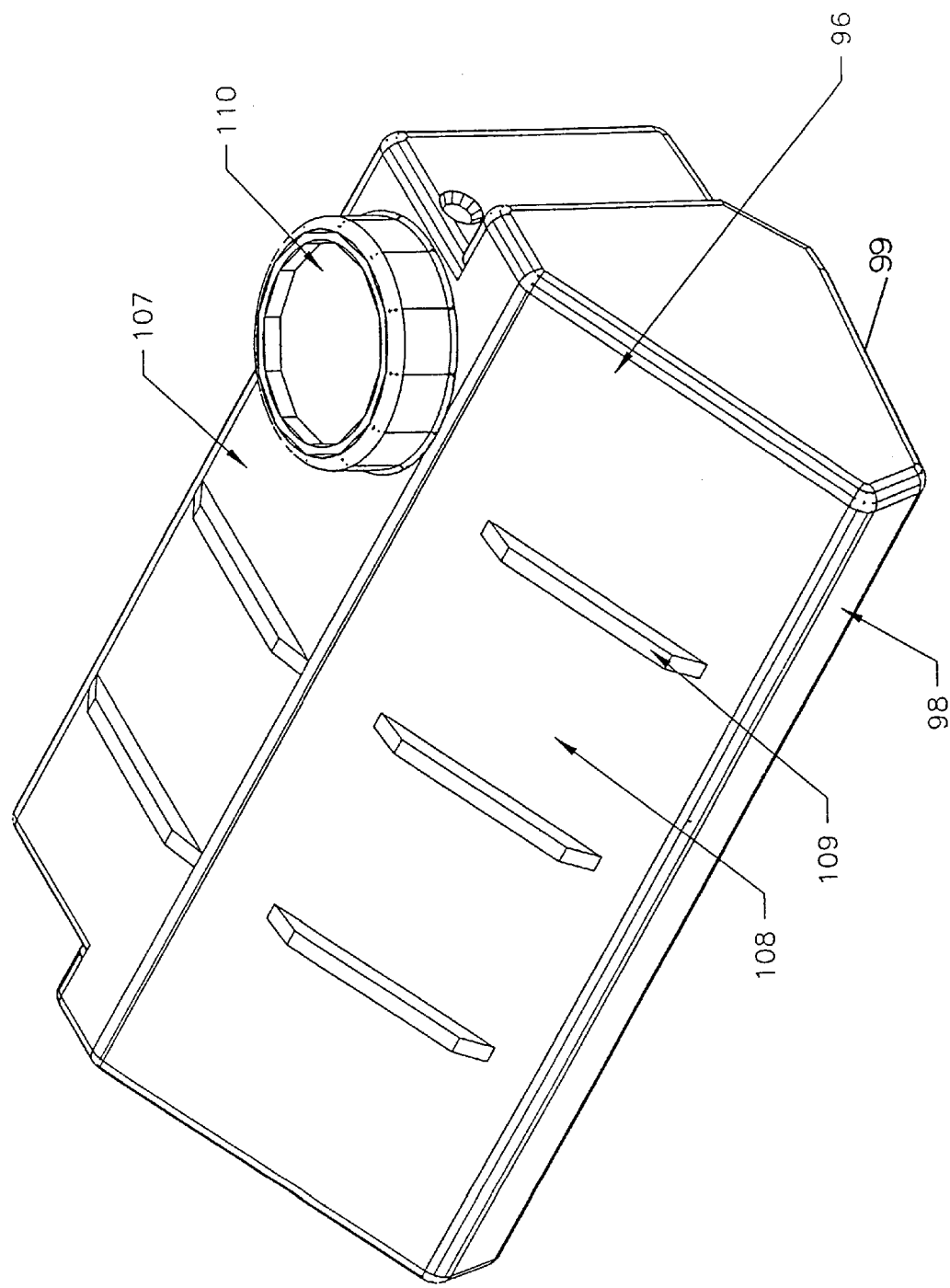
FIG. 17 is an isometric view from the rear and one side of the tank of the attachment.
Figure 18:
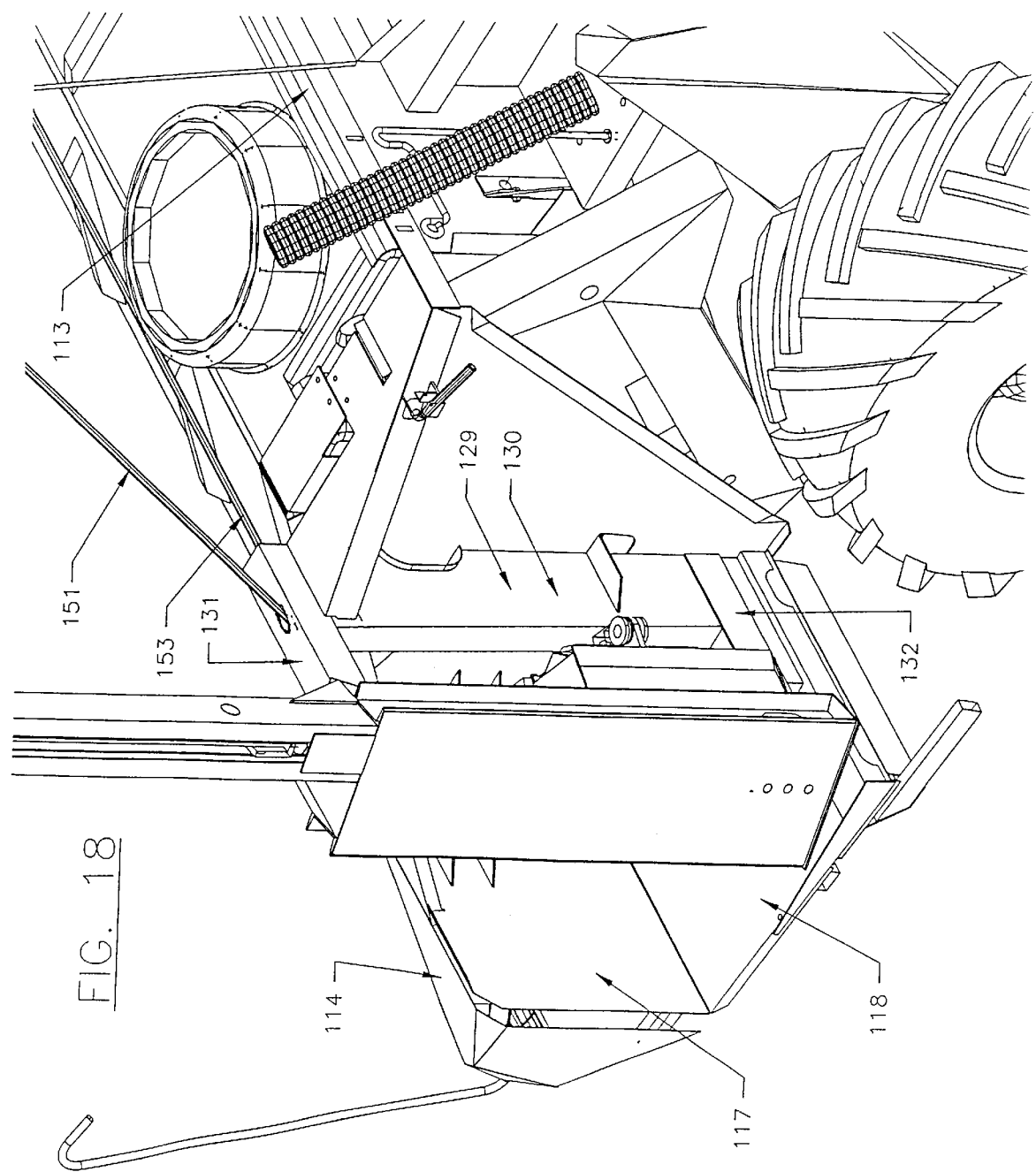
FIG. 18 is an isometric view from the rear and one side of the attachment.

The central frame 18 is shown in more detail in FIGS. 12, 13, 14 and 15. This includes a tank 95 illustrated separately in FIGS. 16 and 17.

The tank 95 includes a top wall 96, a rear wall 97, a front wall 98, a bottom wall 99 and two side walls 100, 101. The rear wall 97 is vertical and generally rectangular. The two side walls 100 and 101 are both vertical and generally at right angles to the rear wall 97. Each of the side walls includes a recess portion 102 which is horizontally recessed in a direction toward the opposite side wall so as to define a vertical side wall portion 103 parallel to a main side wall portion. The recess portion extends to the bottom wall and to the top wall so the bottom and top walls are formed with a cut out section. The recess portion defines a step wall 104 in the side wall which includes an upper vertical portion and a lower forwardly and downwardly inclined portion 105. The bottom wall 99 includes a dropped channel section 106 along a center line of the tank for acting as a sump. Otherwise the bottom wall 99 is generally horizontal with a slight slope toward the sump. The top wall 96 includes a horizontal rear portion 107 which is parallel to the bottom wall and a forwardly and downwardly inclined front section 108 which is designed to follow approximately the line of vision of the operator so an operator looking forwardly over the console within the cab has a sight line lying along the inclined section 108 to allow viewing of the ground forwardly of the tractor as close as possible to the front of the tractor and more particularly the front boom section 91 for observation of the proper operation of the nozzles. The top wall 96 is reinforced by upstanding ribs 109 molded into the plastics material forming the tank. The horizontal rear section 107 of the top wall includes an opening adjacent one end which is covered by a removable cover 110 allowing the tank to be filled with material to be sprayed.

The tank 95 is mounted within a rigid fabricated frame structure which surrounds and contains the tank and provides structural support for the tank and for the masts 21. The frame structure includes a front sheet 111 and a bottom pan 112 which underlie the front wall and bottom wall respectively of the tank and provides support therefore. The frame further includes a rear vertical wall 113 in contact with the rear wall 97 of the tank. The frame further includes side walls lying in contact with the side walls 100 and 101 of the tank and shaped to follow those side walls.

On each side of the frame structure so formed is provided a pair of pods 114 and 115 which are supported by the side walls of the frame and project outwardly to a respective side in front of a respective one of the front ground wheels. Each pod is shaped so as to converge to a forwardly extending nose to act as a crop deflector in conventional manner. On the inside surface of each pod is provided a receptacle 116 which has an outer wall coextensive with that portion of the side wall in contact with the main portion of the side wall of the tank and an inner side wall co-extensive with the recess wall portion 103. The receptacle is closed at the forward end by a front wall 117 and at the bottom by a bottom plate 118.

The receptacles 116 each receive a respective one of a pair of implement support arms 120, 121 which are carried on the frame of the tractor with each extending forwardly from a respective one of the support legs of the front ground wheels. This form of tractor is well known and one example is shown in the prior mentioned brochure of MacDon and the implement support arms of a conventional nature with an upper forwardly extending strut 123 and lower forwardly extending strut 124 both attached to a rear support section carried on the frame.

The recess portions of the tank are shaped and arranged so as to receive the arms therein. Thus the forward part of the tank extends outwardly to the sides in front of the arms while the arms are received behind the forward part within the recess portions and underneath the tank. Thus the lower arms 124 extend into the receptacles 116 while the upper arms extend into the area within the recess portions for engaging a top plate 125 of the frame. The frame thus includes a lower support surface 16A in the receptacle 116 sitting on a rubber block 16B on the lower arm 124. A pin 16C locks the frame in place on the lower arm. The top plate 125 includes a recess 16D receiving an end of the upper arm 123 locked in place by a pin 16E.

The shaping of the tank with the recessed portions allows the tank to provide the maximum size while providing an area into which the arms can project for providing a proper support of the frame and the tank on the implement support arms.

The implement support arms are normally mounted upon a float spring 127 which provides a lifting action on the implement support arms while the implement support arms can be also raised and lowered using hydraulic cylinders (well known to one skilled in the art).

When the attachment is mounted on the implement support arms, the lifting action is disabled and the float springs 127 are disconnected and carried on a suitable support bracket disconnected from the system. Thus the frame 18 of the attachment remains in fixed position at a constant height relative to the tractor while the lifting of the booms is effected on the masts 21 as described hereinafter.

Figure 14:
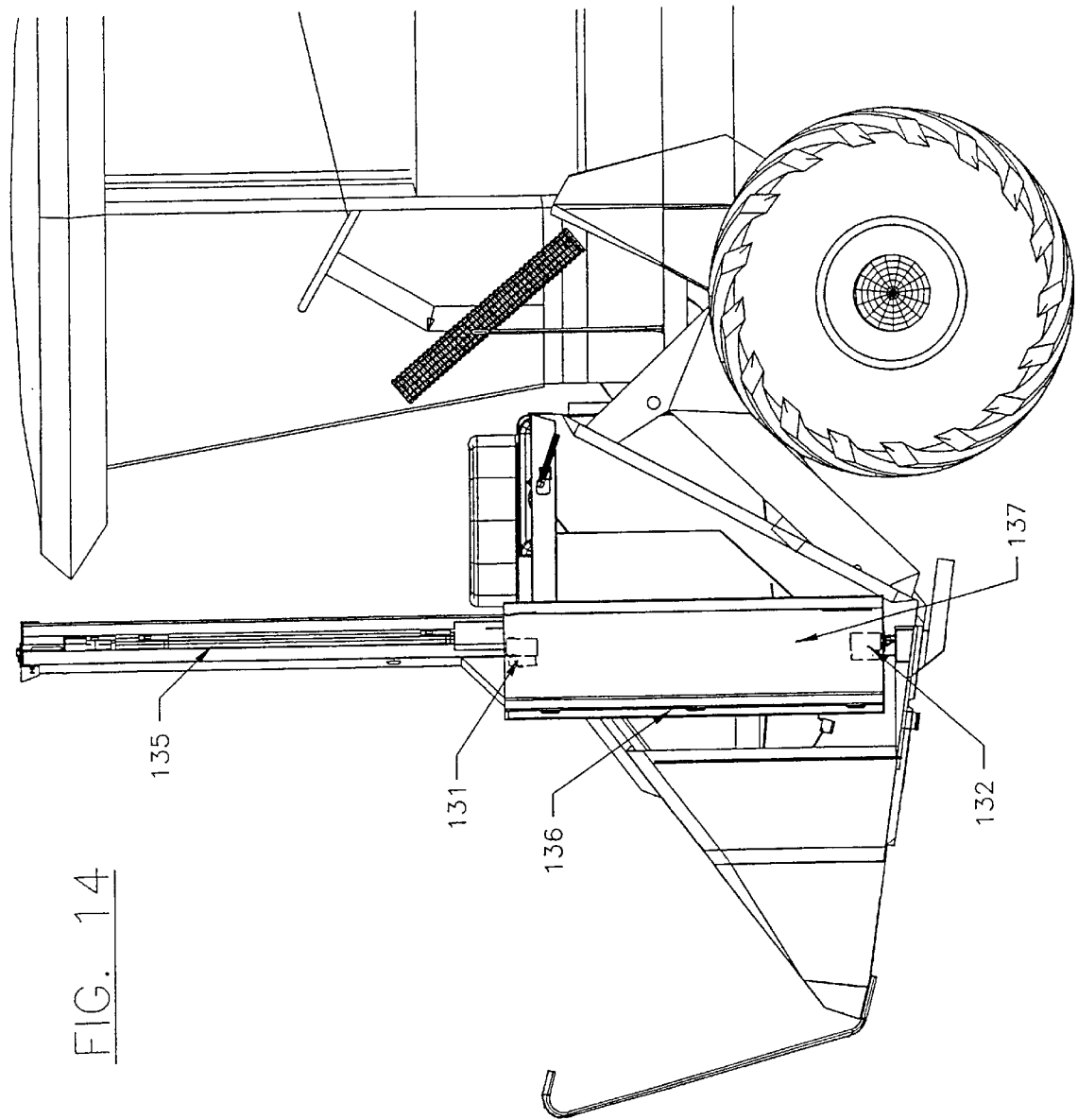
FIG. 14 is the same side elevational of the part of the tractor and attachment shown in FIG. 13 showing the mast in the working position.
Figure 15:
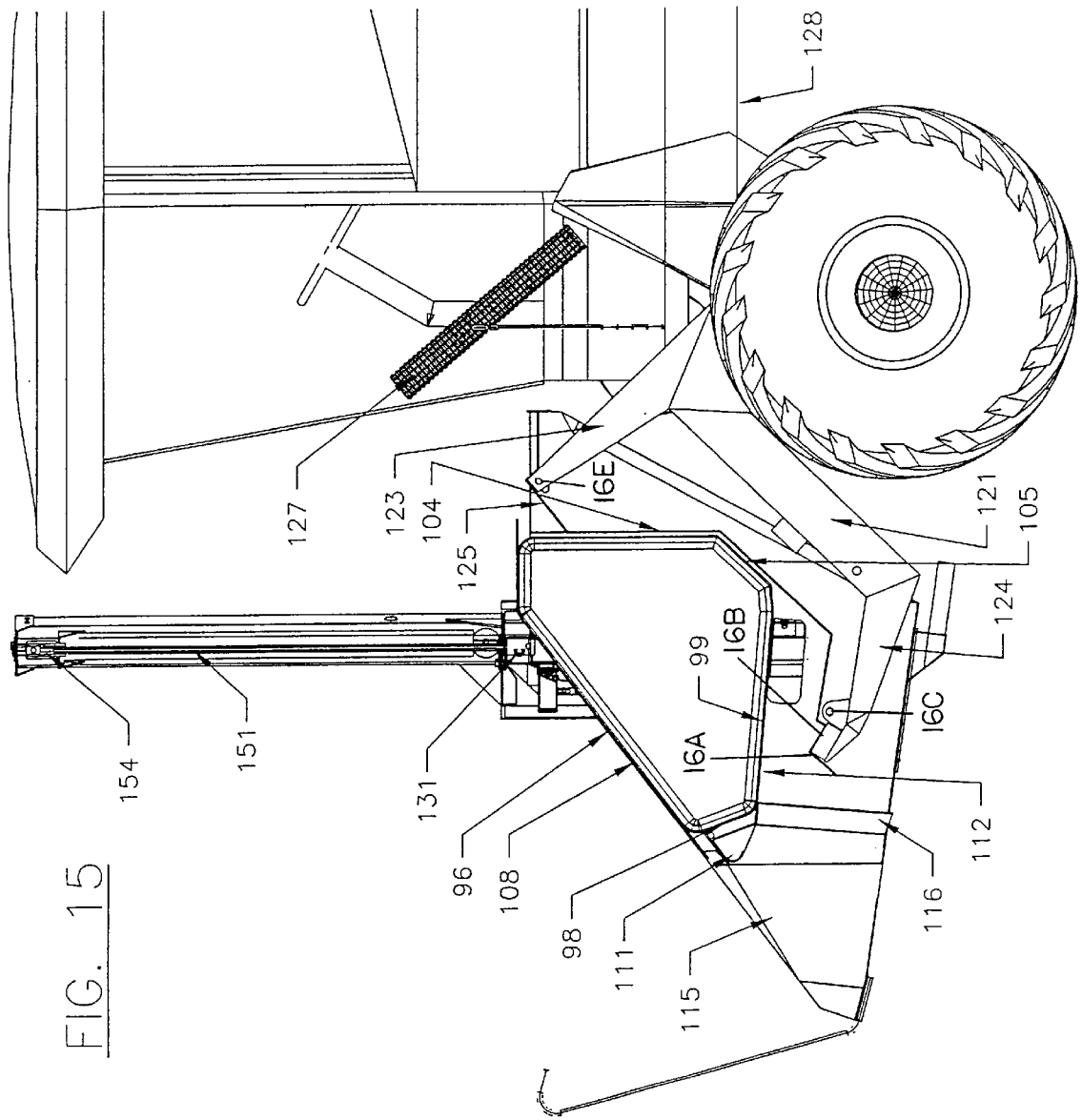
FIG. 15 is a cross-sectional view along the lines 15—15 of FIG. 12.

The bottom pan 112 of the frame is arranged at a height so that it is substantially horizontal and slightly below or equal to a bottom surface 128 of the frame of the tractor. Thus the clearance provided by the frame of the tractor is not compromised by the addition of the attachment in the main area of the tank. The receptacle 116 and the pods 114, 115 project down below the bottom sheet 112 but these are of limited width adjacent the arms 120, 121 and in front of the ground wheels 14. Each side wall of the frame behind the respective pod carries a mast support structure comprising a vertical post 130 and a pair of horizontal arms 131, 132. The arm 131 is arranged just in front of the front edge of the horizontal upper portion of the tank and the lower arm is aligned vertically with the upper arm. Each of the arms carries at its outer end a swivel bracket for receiving a swivel pin and clevis of the mast. The mast can therefore rotate about a vertical axis defined by the swivel pins. The mast as shown in FIG. 14 comprises an upper single slide track 135 and a lower pair of slide tracks 136 and 137 for receiving respectively the rollers 38 and 33 of the boom. The single slide track 135 is the only structure extending up above the tank so that mast in this area is relatively narrow to avoid a serious reduction in visibility from the cab. The boom lift cylinder is located in this structure so as to avoid reducing visibility. Rotation of the mast about the vertical axis is effected by a cylinder 138 located within the pod and extending from the pod rearwardly to the mast at a suitable bracket thereon for effecting the swiveling movement between the working and transport positions.

The boom is moved vertically on the mast by a sliding action of the upper roller in the slide guide 135 and similar simultaneous sliding movements of the bottom rollers in the slide guides 136 and 137. This movement is effected by the boom lift cylinder mounted in the mast. The movement is such that in the bottom position of the boom, the bottom rollers sit at the bottom of the tracks 136 and 137 and top roller sits at the bottom of the track 135. The length of the tracks is substantially equal so that at the top position the rollers move to the top of the respective guide track. Adjustment of the height of the boom between these extreme positions can be effected to a required position by actuating the cylinder.

The tractor frame carries a PTO drive shaft 140 mounted on the frame and extending forwardly from the frame for driving the conventional implement to carry on the implement support arms. In the use of the attachment, the drive shaft is not required but in order to ensure that the tank is moved as far back as possible, a hole is formed in the rear wall 113 of the frame and a recess 141 is defined in the tank. In order for the recess to align with the PTO drive shaft, the recess is offset toward the righthand side of the tank and is positioned approximately mid-height of the rear wall 97.

The masts 21 are interconnected simply by cross braces including a first horizontal brace connected across the top of the masts and indicated at 150 and two diagonal braces 151 and 152 which extend from the bottom of the upper part of the mast to the top of the other mast. As these braces are only in tension they can be formed by cables thus avoiding interfering with the visibility of the operator. An additional brace 153 extends from the bottom of the left upper track to the bottom of the right upper track. The braces are attached to a swivel coupling 154 at the top of the respective mast thus allowing the mast to rotate relative to the swivel coupling and the tension braces.

Figure 19:
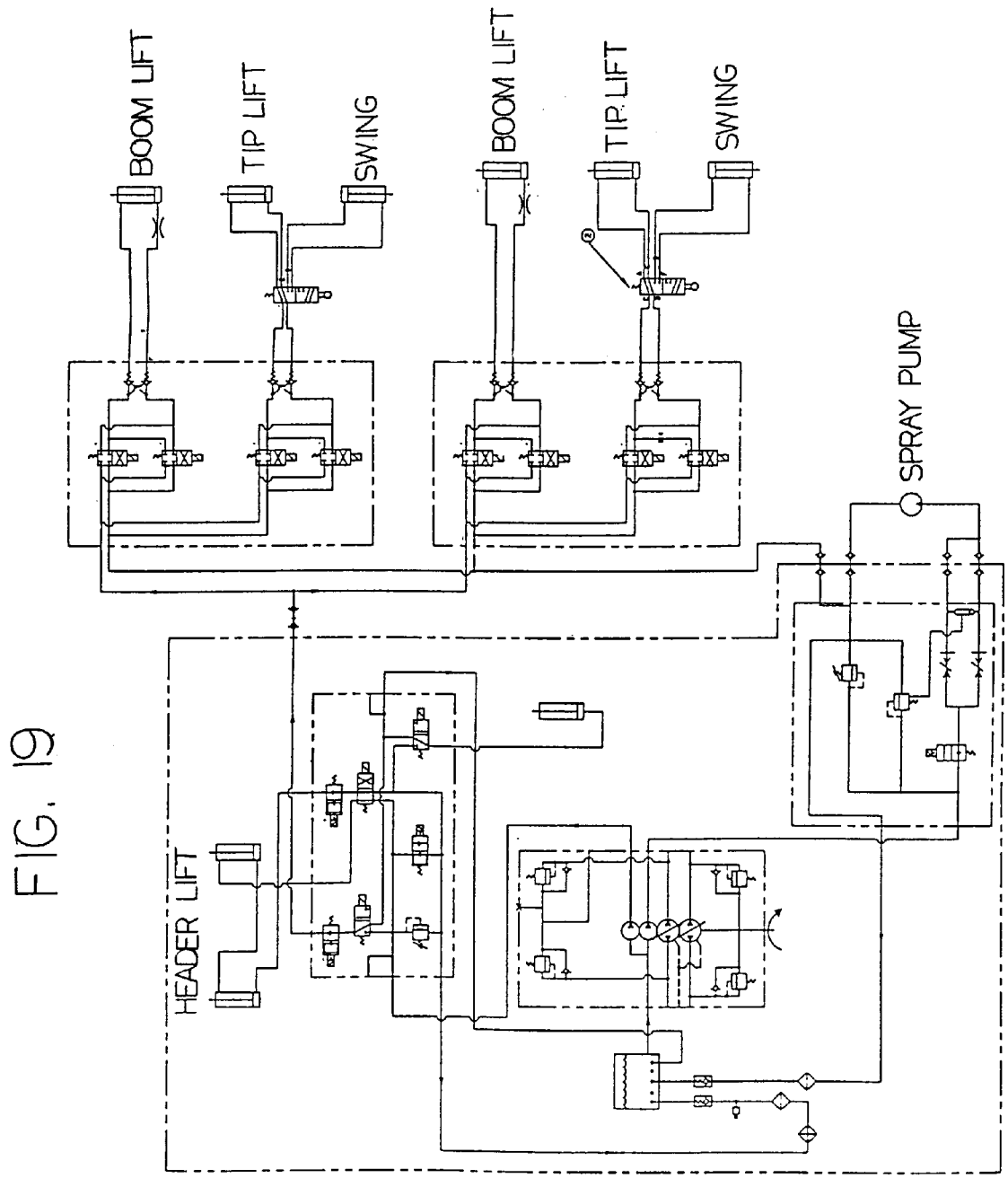
FIG. 19 is a schematic layout of the hydraulic circuit for controlling the attachment from the tractor.
Figure 20:
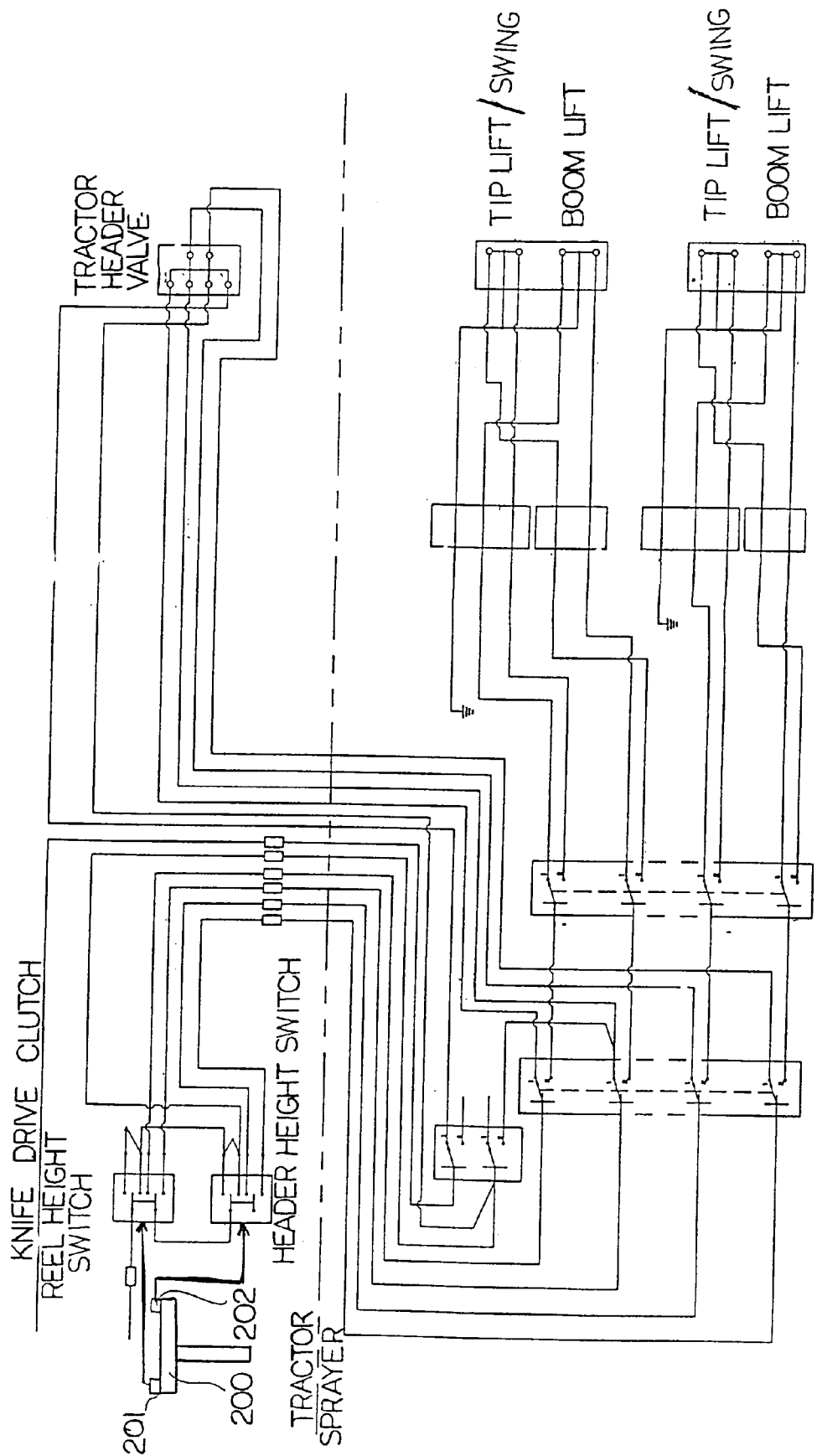
FIG. 20 is a schematic layout of the electrical circuit for controlling the attachment from the tractor.

The spreader attachment is controlled by a control system including a hydraulic component as shown in FIG. 19 and an electrical component as shown in FIG. 20. The tractor, as previously described includes a cab having control elements for the operator including a steering wheel (not shown) and a speed control lever 200 having a manually operable handle to control the hydraulic drive system of the tractor. On the handle are provided two switches including a left-hand switch 201 and a righthand switch 202. These conventionally control the header lift and reel lift of the swather attachment for the tractor. The details of these devices are not shown as they will be well known to one skilled in the art form the commercially available machines manufactured by the assignees of this application.

The sprayer is controlled by the existing switches mounted on the speed control lever. This allows the operator to keep his righthand on the speed control lever to adjust the ground speed and sprayer boom height simultaneously. This is very desirable when maneuvering around and over obstacles.

The control system makes it very easy to change between swather operation and sprayer operation.

It is impossible to engage the header Power Take Off Shaft (PTO) when the sprayer is installed. The Power Take Off shaft is not designed to rotate in the storage position. If the operator neglects to remove the shaft when he installs the sprayer then this feature will prevent damage.

It is possible to use the sprayer using the existing hydraulic connections installed at the factory. Modifications to a hydraulic system at a dealership or farm yard takes time, are sometimes done wrongly so the machine does not function, and may result in contamination entering the system and damaging hydraulic components.

It is possible to install the sprayer without cutting into or splicing into the existing electrical system. These modifications also take time, are easily done wrongly, and may result in unreliable operation.

The control system prevents the booms from being swung back into storage position unless the boom is at the top of the lift. This prevents the boom from being swung back into contact with the front tire and being damaged.

Referring to Header & Reel Lift Hydraulic schematic FIG. 19 and electrical schematic FIG. 20, the operation of the switches with the swather is shown. Thus when the tractor engine is running but the header is not, oil is pumped from the tank by the auxiliary hydraulic pump to valve block port P. Oil flows though valve S1, back through port T and is conducted through the cooler, filter and back pressure valve to the tank. The back pressure valve maintains sufficient pressure for flow to charge the traction drive pump circuit through line 10.

When the header drive switch is positioned to energized circuit 412, valve S6 is energized to direct charge pressure to the PTO clutch cylinder. This tightens the drive belt to drive the PTO shaft. When valve S6 is de-energized the oil is drained through T1 directly back to tank.

When the reel lift switch 201 (on the speed control lever) is operated to lower the reel, valve S3 is energized through circuit 444. This allows oil to drain from the reel lift cylinders back though T1 to the tank.

When the switch 201 is operated to raise the reel, circuits 443 and 433 are energized. Circuit 433 causes the valve S1 to close and cause oil pressure to build up to the relief valve setting. Circuit 443 causes the valve S2 to shift to direct pressurized oil to the reel lift circuit to extend the reel lift cylinders.

When the header lift switch 202 (on the speed control lever) is operated to lower the header, circuits 433 and 442 are energized. Circuit 433 causes valve S1 to close and cause oil pressure to build up to the relief valve setting. This pressure is applied to the rod end of the slave header lift cylinder. Circuit 442 causes the valve S5 to shift to allow oil from the head end of the master header lift cylinder to flow back through T1 to the tank.

When header switch 202 is operated to raise the header, circuits 433 and 441 are energized. Circuit 433 causes the valve S1 to close and cause oil pressure to build up to the relief valve setting. Circuit 441 causes the valve S5 to shift to allow pressurized oil to flow to extend the master header lift cylinder. This also allows oil to flow back through port T1 to the tank.

When the swather is removed and the spreader or sprayer attached, the sprayer hydraulic system is connected to the existing reel lift quick coupling on the tractor. This becomes the source of pressurized oil for the sprayer. The return line is connected to an existing return line for the header reel or draper drive.

The existing tractor wires are unplugged from the header control valve block and plugged into the corresponding positions on the sprayer wiring harness. The connectors from the sprayer wiring harness are plugged into the header control valve block.

Three switches are installed on a panel in the tractor cab. Switches SW1 and SW2 are operated together to change the control mode from swather to sprayer. SW3 is used to switch between sprayer boom lift and sprayer boom tip lift/swing. In order to change from spray position to transport the operator completes the following steps:

Position SW3 in position 2 and operate switches on speed control handle to raise boom tips up and fold in transport position.

Change SW3 to position 1 and raise booms to top position. (This shifts selector valve to swing).

Change SW3 to position 2 and swing booms into transport position parallel to tractor.

Change SW3 to position 1 and lower booms into transport cradles.

The left switch on the speed control lever is used to control the left boom and the right switch is used to control the right boom.

When SW1 and SW2 are in position 1 then the wiring control system is connected exactly as it was before the sprayer was installed.

When SW1 and SW2 are in position 2 then the system is set up for sprayer operation.

When SW1 is in position 2 then circuit 412 is interrupted so that the PTO clutch will not engage. The circuit to the valve that controls reel and draper drive is not interrupted. This flow is used to drive the spray pump.

When the left or right (reel lift or header lift) switch on the speed control lever is activated in up or down position then circuit 433 is energized. Circuit 433 causes the valve S1 to close and cause oil pressure to build up to the relief valve setting. Circuit 433 is also connected through circuit 443A to the valve S2. This applies pressure to the reel lift hydraulic line. Thus in sprayer mode, pressurized oil is available at the reel lift coupling when ever the reel or header switches is operated in either direction.

With SW3 in position 1 for boom lift, when the right switch (reel lift) is moved to the down position circuit 444 is energized. This is conducted through switches SW1 and SW3 to circuit A1. This energizes the valve S4 on the right side sprayer valve block. This directs pressurized oil to the rod end of the right boom lift cylinder and allow oil to flow from the base of the cylinder back through the valve block to the return and back to tank. Similarly, when the switch is moved to the up position, oil is directed to the base of the cylinder to extend the cylinder.

A two position selector valve is spring loaded to one position. When the boom is moved to the top a link shifts the valve to the other position.

When the switch SW3 is in position 2 and the boom is below the top position, and when the right (reel lift) is moved to the down position, the circuit 444 is energized. This is conducted through switches SW1 and SW3 to circuit A2. This energizes valve S1 on the right side sprayer valve block. This directs oil through the selector valve to the base of the tip lift cylinder. Similarly, when the switch is moved to the up position, oil is directed to the rod end to retract the cylinder.

With the switch SW3 in position 2 and the boom at the top position, when the right (reel lift) is moved to the down position circuit 444 is energized. This is conducted through switches SW1 and SW3 to circuit A2. This energizes valve S1 on the right side sprayer valve block. This directs oil to the base of the swing cylinder. Similarly, when the switch is moved to the up position, oil is directed to the rod end to retract the cylinder.

The left side of the sprayer is similarly controlled by the left switch 201 on the speed control lever.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A material spreader attachment for mounting on a tractor, wherein the tractor comprises a tractor frame, a plurality of ground wheels mounted on the frame for movement of the frame across the ground including a pair of front wheels spaced apart at a front of the frame, a cab located on the frame adjacent the front of the frame, and a pair of transversely spaced implement support arms mounted on the frame at the front of the frame so as to support an implement at the front of the frame;

the spreader attachment comprising:

a spreader frame arranged for mounting on the implement support arms for support thereby so as to be transported on the tractor across the ground, a tank for a fluid material to be distributed across the ground, the tank being mounted on the spreader frame;

a pair of booms each mounted on the spreader frame so as to extend outwardly to a respective side of the tractor and including a plurality of material distribution nozzles at spaced positions along the length of the boom;

the tank having a rear wall, a bottom wall, a front wall, a top wall and two side walls connected to form an integral hollow structure for receiving the material;

the side walls each having a horizontally recessed portion at the rear wall such that a width of the rear wall at the recessed portions is less than a width of the front wall, each recessed portion being arranged to receive a respective one of the implement support arms therein.

2. The spreader attachment according to claim 1 wherein the recessed portion of each side wall extends from the top wall to the bottom wall.

3. The spreader attachment according to claim 1 wherein the top wall and bottom wall are substantially parallel at the recessed portion of each side wall.

4. The spreader attachment according to claim 1 wherein the top wall includes a front portion thereof which is forwardly and downwardly inclined such that the front wall has a height which is less than a height of the rear wall.

5. The spreader attachment according to claim 4 wherein the top wall includes a substantially horizontal portion extending to the rear wall rearwardly of the front portion.

6. The spreader attachment according to claim 1 wherein the tractor includes a PTO drive shaft for driving the implement and wherein the rear wall has a recess therein for receiving the PTO drive shaft which projects therein.

7. The spreader attachment according to claim 1 wherein the bottom wall of the tank is substantially horizontal and substantially at a common height with a bottom surface of the tractor frame.

8. A tractor having a material spreader attachment mounted thereon comprising:

a tractor frame;

a plurality of ground wheels mounted on the frame for movement of the frame across the ground including a pair of front wheels spaced apart at a front of the frame;

a cab located on the frame adjacent the front of the frame;

a pair of transversely spaced implement support arms mounted on the frame at the front of the frame so as to support an implement at the front of the frame;

a speed control lever mounted in the cab having a handle which is manually operable for controlling a forward speed of the tractor, the handle having a first switch on a left-hand side of the handle and a second switch on a right-hand side of the handle;

a spreader frame arranged for mounting on the implement support arms for support thereby so as to be transported on the tractor across the ground;

a tank for a fluid material to be distributed across the ground, the tank being mounted on the spreader frame;

a left-hand boom and a right-hand boom each mounted on the spreader frame so as to extend outwardly to a respective side of the tractor and including a plurality of material distribution nozzles at spaced positions along the length of the boom;

a left-hand lift member on the spreader frame for raising and lowering the left-hand boom;

a right-hand lift member on the spreader frame for raising and lowering the right-hand boom;

and a control system responsive to the first switch on the left-hand side for raising and lowering the left-hand boom and to the second switch on the right-hand side for raising and lowering the right-hand boom.

9. The tractor according to claim 8 wherein:

the tractor includes a swather attachment having a header for mounting on the implement support arms in replacement for the spreader attachment and a reel mounted on the header;

the control system is arranged such that operation of one of the switches actuates raising and lowering of the header and operation of one of the first and second switches actuates raising and lowering of the header;

the control system includes a supplementary control system of the spreader attachment co-operating with a master control system of the tractor;

there is provided a conversion switch for changing from a control system of the swather attachment to the supplementary control system of the spreader attachment.

10. The tractor according to claim 8 wherein the control system includes an electrical circuit actuated by the first and second switches and an hydraulic circuit actuated by the electrical circuit.

11. The tractor according to claim 8 wherein each boom includes a main boom lift and a tip lift and wherein there is provided a further switch operable for changing operation of the first and second switch between the boom lift and the tip lift.

12. A material spreader attachment for mounting on a tractor, wherein the tractor comprises a tractor frame, a plurality of ground wheels mounted on the frame for movement of the frame across the ground including a pair of front wheels spaced apart at a front of the frame, a cab located on the frame adjacent the front of the frame, and a pair of transversely spaced implement support arms mounted on the frame at the front of the frame so as to support an implement at the front of the frame;

the spreader attachment comprising:

a spreader frame arranged for mounting on the implement support arms for support thereby so as to be transported on the tractor across the ground, a tank for a fluid material to be distributed across the ground, the tank being mounted on the spreader frame;

a pair of booms each mounted on the spreader frame so as to extend outwardly to a respective side of the tractor and including a plurality of material distribution nozzles at spaced positions along the length of the boom;

a pair of boom support masts each carrying a respective one of the booms with each mast being mounted on the frame for movement therewith;

each boom including an upper mounting bracket and at least one lower mounting bracket at a fixed spacing from the upper mounting bracket;

each boom being mounted by the upper mounting bracket and the lower mounting bracket on the respective mast for common movement of the boom including the upper mounting bracket and the lower mounting bracket relative to the respective mast in a substantially vertical, height adjustment direction independently of the other boom.

13. The spreader attachment according to claim 12 wherein each boom support mast is rotatable about a vertical axis for movement of the boom between a folded transport position at the tractor and an extended working position.

14. The spreader attachment according to claim 12 wherein the tractor includes a control lever operable in sliding movement to control a forward speed of the tractor and two switches on the control lever for controlling the implement and wherein the attachment includes a hydraulic circuit and electrical control circuit arranged such that operation of one of the switches on the control lever operates said movement in the vertical height adjustment direction of one boom and operation of the other of the switches controls movement in the vertical height adjustment direction of the other boom.

15. The spreader attachment according to claim 12 wherein the upper mounting bracket of each boom comprises a single upper slide member and wherein the at least one lower mounting bracket comprises a pair of lower slide members which are transversely spaced so that the upper and lower slide members lie at apexes of a triangle and wherein each boom support mast includes a single slide guide for receiving the upper slide member and a pair of lower slide guides each for receiving a respective one of the lower slide members.

16. The spreader attachment according to claim 12 wherein the boom support masts are interconnected by transverse tension braces.

17. The spreader attachment according to claim 12 wherein each boom includes an outwardly and downwardly inclined brace extending from the upper mounting bracket and wherein there is provided an energy damping spring system located in the brace for allowing suspension movements of the boom relative to the boom support mast.

18. The spreader attachment according to claim 12 including a front boom portion mounted in front of the frame between the masts, the front boom portion having one end attached to a respective one of the booms and the other end attached to the other respective one of the booms for independent movement in the vertical height adjustment direction of the ends of the front boom section with the respective one of the booms.

19. The spreader attachment according to claim 14 wherein each boom includes an inner section and an outer section, the outer section being pivotally movable relative to the inner section about a horizontal axis at the outer end of the inner section and wherein there is provided a control switch operable to change operation of the first and second switches between a first position of the control switch in which one of the switches on the control lever operates movement in the vertical height adjustment direction of one boom and operation of the other of the switches controls movement in the vertical height adjustment direction of the other boom and a second position of the control switch in which one of the switches on the control lever operates movement in the vertical height adjustment direction of the outer section only of one boom and operation of the other of the switches controls movement in the vertical height adjustment direction of the outer section only of the other boom.

20. A material spreader attachment for mounting on a tractor, wherein the tractor comprises a tractor frame, a plurality of ground wheels mounted on the frame for movement of the frame across the ground including a pair of front wheels spaced apart at a front of the frame, a cab located on the frame adjacent the front of the frame, and a pair of transversely spaced implement support arms mounted on the frame at the front of the frame so as to support an implement at the front of the frame;

the spreader attachment comprising:

a spreader frame arranged for mounting on the implement support arms for support thereby so as to be transported on the tractor across the ground, a tank for a fluid material to be distributed across the ground, the tank being mounted on the spreader frame;

a pair of booms each mounted on the spreader frame so as to extend outwardly to a respective side of the tractor and including a plurality of material distribution nozzles at spaced positions along the length of the boom;

each boom being movable between a folded transport position at the tractor and an extended working position in which the boom extends outwardly to a respective side of the tractor;

each boom being arranged in the working position so as to be inclined outwardly and rearwardly relative to a direction of forward movement of the tractor such that an outer end of each boom is rearward of an inner end of the respective boom;

wherein an inner end of each boom is arranged forwardly of the front wheels and an outer end of each boom is arranged rearwardly of the front wheels.

21. The spreader attachment according to claim 20 wherein an inner end of each boom is arranged forwardly of the cab and an outer end of each boom is arranged rearwardly of the cab.

* * * * *